United States Patent
Gao

(10) Patent No.: US 11,423,930 B2
(45) Date of Patent: Aug. 23, 2022

(54) HARD DISK DRIVE WITH COMPOSITE PERMANENT MAGNET

(71) Applicant: Kaizhong Gao, North Oaks, MN (US)

(72) Inventor: Kaizhong Gao, North Oaks, MN (US)

( * ) Notice: Subject to any disclaimer, the term of this patent is extended or adjusted under 35 U.S.C. 154(b) by 0 days.

(21) Appl. No.: 17/117,089

(22) Filed: Dec. 9, 2020

(65) Prior Publication Data

US 2022/0139420 A1 May 5, 2022

Related U.S. Application Data

(60) Provisional application No. 63/108,434, filed on Nov. 1, 2020.

(51) Int. Cl.
| | |
|---|---|
| *G11B 5/48* | (2006.01) |
| *G11B 5/127* | (2006.01) |
| *H02K 41/035* | (2006.01) |
| *H02K 1/02* | (2006.01) |

(52) U.S. Cl.
CPC .......... *G11B 5/4813* (2013.01); *G11B 5/1274* (2013.01); *H02K 1/02* (2013.01); *H02K 41/0354* (2013.01)

(58) Field of Classification Search
None
See application file for complete search history.

(56) References Cited

U.S. PATENT DOCUMENTS

| | | | | |
|---|---|---|---|---|
| 7,135,792 B2* | 11/2006 | Devaney | ............ | H02K 41/0358 310/12.25 |
| 7,368,838 B2* | 5/2008 | Binnard | ............ | H02K 41/0356 310/15 |
| 8,446,054 B2* | 5/2013 | Toyota | ................. | H02K 41/031 310/12.24 |
| 9,942,663 B1* | 4/2018 | Salvatti | ................. | H04R 9/025 |
| 10,063,128 B2* | 8/2018 | Wang | ..................... | H02K 33/16 |
| 2005/0190505 A1* | 9/2005 | Fujimoto | ................. | G11B 5/54 360/264.7 |
| 2006/0091733 A1* | 5/2006 | Binnard | ............ | H02K 41/0356 310/12.16 |
| 2016/0380524 A1* | 12/2016 | Duan | ...................... | H02K 7/09 310/12.16 |

FOREIGN PATENT DOCUMENTS

CN      207345548 U  *  5/2018

* cited by examiner

Primary Examiner — William J Klimowicz

(57) ABSTRACT

A hard disk drive includes a drive case and a cover plate, the storage media platers and a spindle, the recording heads and actuators, the connection port, the control logic board and one or more voice coil motor, where the actuators are operated via a voice coil motor; wherein the voice coil motor magnets comprise of a pair of composite permanent magnets on both sides of the voice coil, where each piece of composite permanent magnet comprising: a first core magnet M1, a cladding magnet Mc12 and a second core magnet M2; the magnetization direction of M1 and M2 are opposite to each other; the magnetization direction of Mc12 is substantially perpendicular to the magnetization direction of M1 and M2; the ratio of the width of Mc12 to the thickness or the height of Mc12 is 4:1 or less as seen from the back view.

18 Claims, 13 Drawing Sheets

HARD DISK DRIVE WITH COMPOSITE PERMANENT MAGNET

CROSS-REFERENCE TO RELATED APPLICATIONS

The present application is in part claims benefit of priority to U.S. Provisional Patent Application No. 63/108,434, entitled "Composite Permanent Magnet" and filed on Nov. 1, 2020.

FIELD OF THE INVENTION

The present disclosure relates to a hard disk drive utilizes novel materials design and apparatus including a composite permanent magnet in its high efficiency voice coil motor (VCM), and the method to produce this novel composite permanent magnet materials for hard disk drive applications.

BACKGROUND OF THE INVENTION

Permanent magnets (PM) create their own persistent magnetic fields and are typically used in electromagnetic induction devices such as motors and generators. Permanent magnets are made from a magnetic material such as ferrite. Additional magnetic materials from rare earth metals, such as Samarium-Cobalt (SmCo), or Neodymium-Iron-Boron (NdFeB) have also been used. While an NdFeB magnet is stronger (e.g., according to maximum energy product (BH) max) than an SmCo magnet which is stronger than ferrite, it becomes difficult to increase the magnetic strength even further and Neodymium magnets are much more expensive than ferrite due to the scarcity of Neodymium.

Moreover, a magnetic field from the magnet is typically strongest at the surface of the magnet. The magnetic field or the magnetic flux density is high at the magnet surface then decreases with distance from the magnet surface due to a large self-demagnetization field generated by surface magnetic charges, thereby reducing the strength of the magnet away from the surface, such that the magnetic flux density decreases with distance from the magnet. Other various magnetic properties such as magnetic anisotropy, magnetic moment and thus magnetic flux density, etc. may decline as the operating temperature increases. Additionally, there are several grades of NdFeB, SmCo, ferrite, etc. magnets, where higher grades indicate stronger magnets. However, the cost of the magnet may increase in proportion with the grade. The torque generated in an electromagnetic induction device, such as a motor, is proportional to the rate change of the magnetic flux density produced by a permanent magnet in the stator. As the magnetic flux density increases, the efficiency of the motor increases. For the case of a hard disk drive, permanent magnets are utilized to rotate magnetic disks and the head stack assembly that host the magnetic recording heads to perform read and write operations. A higher magnetic field gradient provided by the permanent magnets will lead to an increased efficiency for drive random access operations or a reduced power consumption. However, for a given limited space such as in a hard disk drive, optimize permanent magnet with manufacturable process is extremely difficult. Thus, all hard disk drives VCM magnets are based on the same permanent magnet structure by gluing or placing two pieces of permanent magnet with opposite magnetization direction together to provide the necessary magnetic field and field gradient for VCM operation.

SUMMARY OF THE INVENTION

The presently disclosed embodiments address many of the issues described above with respect to the permanent magnets that utilized in a hard disk drive. The permanent magnets described herein address these disadvantages, having a high magnetic flux density, thereby increasing the efficiencies of motors and generators that implement the permanent magnets. The embodiments disclosed herein are suitable for use in many applications, particular for hard disk drive VCM in which permanent magnets are presently employed.

In an embodiment, a hard disk drive includes composite permanent magnet as the VCM magnet, wherein the composite permanent magnet comprising: a first core magnet M1 and a second core magnet M2 and a cladding magnet Mc12. The magnetization direction of M1 and M2 are opposite to each other. The magnetization direction of the cladding magnet Mc12 is substantially perpendicular to or with an acute angle with respect to the magnetization direction of M1 and M2. In an embodiment, M1 and M2 are deposited, bonded, glued, sintered or assembled together, or placed next to each other with a cladding magnet Mc12 in between M1 and M2. Further in an embodiment, the composite permanent magnet is attached to a soft magnetic yoke and form a composite permanent magnet component. In practice, the soft magnetic yoke can be a flat plate with a predefined shape. The soft magnetic yoke may further include mounting holes. The size of the cladding magnet Mc12 is substantially smaller than the core magnet M1 or M2.

In another embodiment, a hard disk drive includes composite permanent magnet as the VCM magnet, wherein a composite permanent magnet comprising: a first cladding magnet Mc11, a first core magnet M1, a second cladding magnet Mc12, a second core magnet M2 and a third cladding magnet Mc22. Mc11, M1, Mc12, M2 and Mc22 are deposited, bonded, glued, sintered or assembled together, or placed next to each other. The magnetization directions of M1 and M2 are opposite to each other. The magnetization direction of Mc12 is substantially perpendicular to the magnetization direction of M1 and M2.

Furthermore, each of the magnetic material may be a ferrite (such as Barium-Iron-Oxygen (Ba—Fe—O), Barium-Nickel-Iron-Oxygen (Ba—Ni—Fe—O), Barium-Strontium-Nickel-Iron-Oxygen (Ba—Sr—Ni—Fe—O), etc.), alnico (such as Aluminum-Nickel-Cobalt (Al—Ni—Co), Aluminum-Nickel-Cobalt-Iron (Al—Ni—Co—Fe), Aluminum-Nickel-Cobalt-Iron-Copper (Al—Ni—Co—Fe—Cu), etc.), rare earth-transition metal-based permanent magnetic materials X-Y or X-Y-Z (where X includes rare-earth elements and their combinations, such as Neodymium (Nd), Samarium (Sm), Gadolinium (Gd), Neodymium-Dysprosium (NdDy), Neodymium-Dysprosium-Terbium-Gadolinium (NdDyTbGd) and Neodymium-Dysprosium-Terbium (NdDyTb), etc.; Y includes transition metal elements and/or their combinations, such as Iron (Fe), Cobalt (Co), Manganese (Mn), Nickel (Ni), Iron-Cobalt (FeCo), Iron-Cobalt-Nickel (FeCoNi), Iron-Cobalt-Nickel-Manganese (FeCoNiMn), etc.; and Z includes non-metal elements and/or other doping elements and their combinations, such as Boron (B), Silicon (Si), Carbon (C), Nitrogen (N), Copper (Cu), Silver (Ag), Zirconium (Zr), etc.), Mn-based permanent magnetic materials X-Y or X-Y-Z (where X includes Mn, Fe, Manganese-Iron (MnFe), etc.; and Y includes Bismuth (Bi), Al, Gallium (Ga), and/or other doping elements such as Praseodymium (Pr), as well as the combination of these elements), transition metal-platinum-based magnetic material X-Y (where X includes transition metal elements and/or their combinations, such as Fe, Co, FeCo, etc.; and Y includes Platinum (Pt), Rhodium (Rh), Palladium (Pd), Zr, and/or their combinations with/without other doping elements), or Iron-Nitride (Fe—N). Specifically, each of the magnets can be Neodymium-Iron-Boron (NdFeB) based materials with different percentage of Neodymium (Nd) concentration.

In another embodiment, a hard disk drive includes composite permanent magnet as the VCM magnet, wherein the composite permanent magnet comprising: a first core magnet M1 and a second core magnet M2, that can be placed together, next to each other or glued together. Wherein the core magnet M1 and M2 have the magnetization direction opposite to each other and perpendicular to the magnet surface. One or more of the magnets M1 or M2 has a cladding magnet, such as Mc11 and Mc21 respectively. The magnetization direction of the cladding magnet Mc11 and Mc21 is perpendicular or with an acute angle with respect to the magnetization direction of core magnet next to it, such as to M1 and M2 respectively.

Each of the above magnet material may be any of the above-mentioned composite magnetic materials. In an embodiment, each magnet utilized in the composite permanent magnet are the same materials or the same type of materials. In another embodiment, the materials for core magnet M1 and M2 use different materials as compare to the cladding magnet, such as Mc12 for the composite permanent magnet with M1, Mc12 and M2. In another embodiment, the materials for M1 and M2 use different materials from Mc11, Mc12 and Mc22 for the composite permanent magnet with Mc11, M1, Mc12, M2 and Mc22.

BRIEF DESCRIPTION OF THE DRAWINGS

The foregoing aspects and many of the attendant advantages described herein will become more fully understood from the detailed description and the accompanying drawings and tables. The drawings constitute a part of this specification and include exemplary embodiments of the invention, which may be embodied in various forms. It is to be understood that in some instances, various aspects of the invention may be shown exaggerated or enlarged to facilitate an understanding of the invention; therefore, the drawings are not necessarily to scale. In addition, in the embodiments depicted herein, like reference numerals in the various drawings refer to the conceptual design or structural elements represent each particular component or element of the apparatus.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DETAILED DESCRIPTION OF THE INVENTION

In the following description, numerous specific details are disclosed to provide a thorough understanding of embodiments of the method, system and apparatus. One skilled in the relevant art will recognize, however, that embodiments of the method, system and apparatus described herein may be practiced without one or more of the specific details, or with other electronic devices, methods, components, and materials, and that various changes and modifications can be made while remaining within the scope of the appended claims. In other instances, well-known electronic devices, components, structures, materials, operations, methods, process steps and the like may not be shown or described in detail to avoid obscuring aspects of the embodiments. Embodiments of the apparatus, method and system are described herein with reference to figures.

Reference throughout this specification to "one embodiment," "an embodiment," or similar language means that a particular feature, structure, electronic device, method or characteristic described in connection with the embodiment is included in at least one embodiment. Thus, appearances of the phrases "in one embodiment," "in an embodiment," and similar language throughout this specification may refer to separate embodiments or may all refer to the same embodiment. Furthermore, the described features, structures, methods, electronic devices, or characteristics may be combined in any suitable manner in one or more embodiments.

Reference throughout this specification to "the magnetization direction" of the permanent magnet or magnet means the permanent magnet's or magnet's magnetization direction in the absent of the external magnetic field after the magnet being magnetized. The magnet with capital letter M and a number 1, 2 . . . n refers to as core magnet in the composite magnet structure, the magnet with letter Mc and two or more digits number Mc11, Mc12 . . . Mc21, Mc22 . . . refers to as cladding magnet in the composite magnet.

Figure 1A:
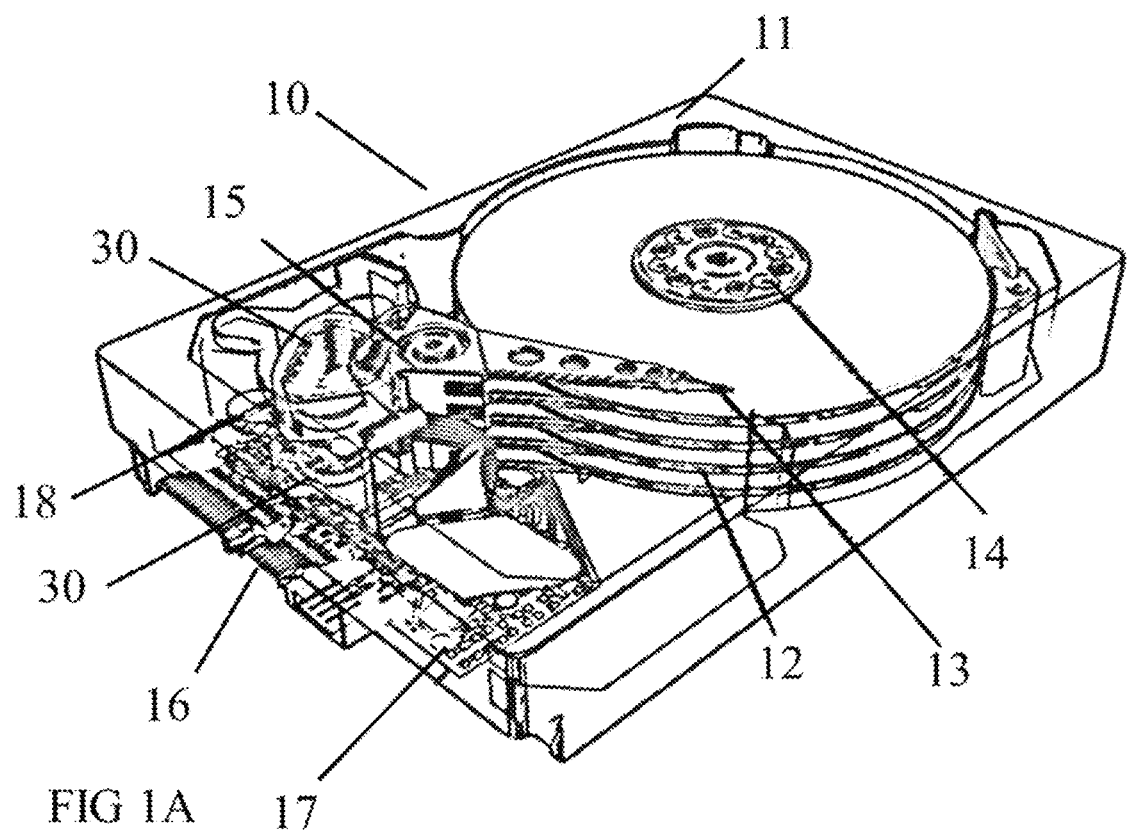
FIG. 1A illustrates a hard disk drive using VCM with permanent magnets.

As illustrated in FIG. 1A, a hard disk drive 10 comprises several components, major components including a hard disk drive base 11 and a cover plate (not shown here), a number of magnetic disks or platters 12, recording read and write heads 13 mounted at one end of the actuators 15, the spindle 14, the logic board or control printed circuit board 17, a connector port 16 etc. The actuators 15 are operated by a voice coil motor (VCM) which consists a voice coil 18 and a pair of magnet components 30 based on permanent magnets.

Figure 1B:
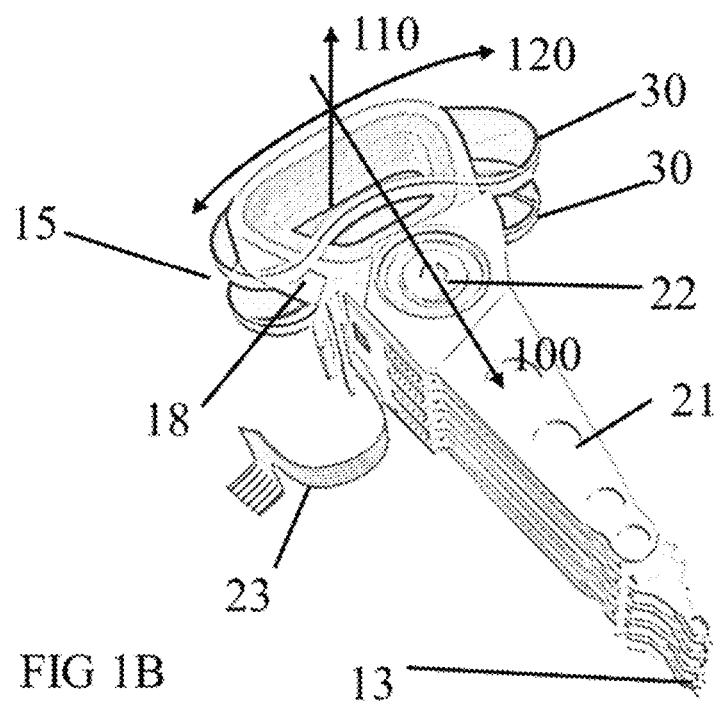
FIG. 1B illustrates a pair of permanent magnets as the VCM magnet on both side of the VCM coil.

As illustrated in FIG. 1B, the actuators 15 are mounted with a pivot 22, consisting of suspension arms 21, with recording read and write heads 13 mounted at one end, the flex circuit line 23 connects the data and the electric current for the read and write operations. The actuators 15 are operated via the VCM, includes a VCM coil 18, and a pair of magnet components 30 based on permanent magnets. The actuators 15 are rotated with a fixed pivot point 22, within a surface. The rotation direction 120 is typically called tangential direction, and the view along that direction is typically and defined herein as the side view. The direction along pivot 22, perpendicular to the tangential direction 120 and the magnet 30 surface, i.e., the direction along 110 is called the axial direction. The view along negative axel direction 110 is defined as the top view. The direction along the rotation radius direction 100 is the radial direction and the view along the direction 100 is defined as the back view.

Figure 1C:
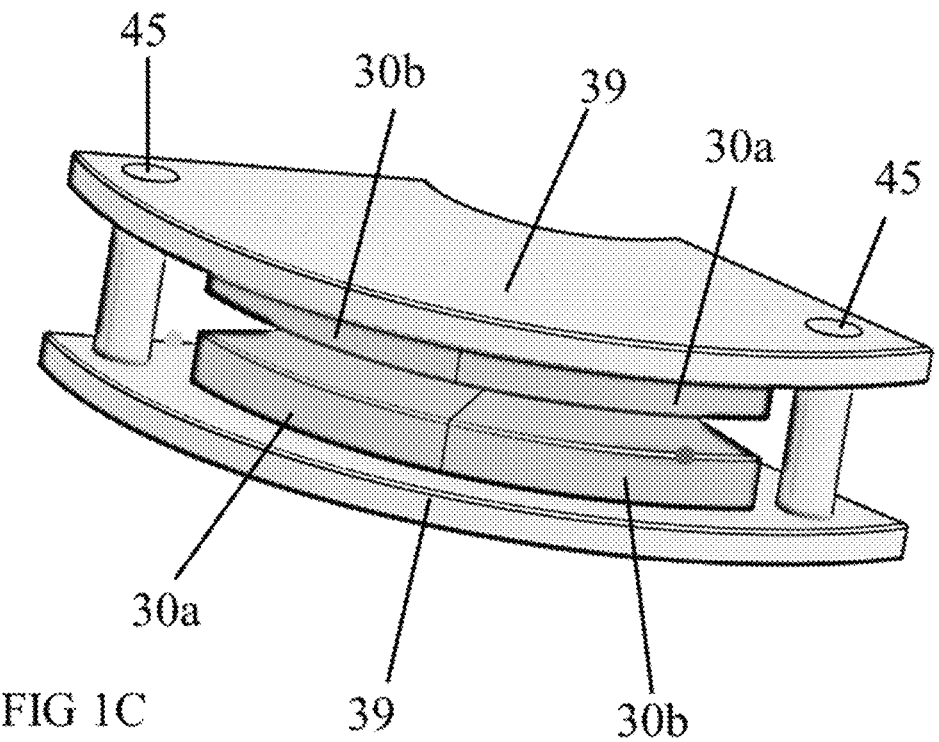
FIG. 1C illustrates the magnet component that includes permanent magnets and the soft magnetic yoke as utilized in current hard disk drive.

FIG. 1C illustrates a perspective view of the magnet component that includes permanent magnets and the soft magnetic yoke as utilized in current hard disk drive. Each magnet component comprises a permanent magnet block 30 including two pieces of permanent magnet 30a and 30b, typically of identical size, attached to a soft magnetic yoke 39. In one of the current approaches, two magnet components are connected in parallel via mounting screws with a fixed separation. In practice, the soft magnetic yoke 39 have predrilled mounting holes 45 to allow the magnet component to be mounted to the hard disk drive base securely.

Figure 1D:
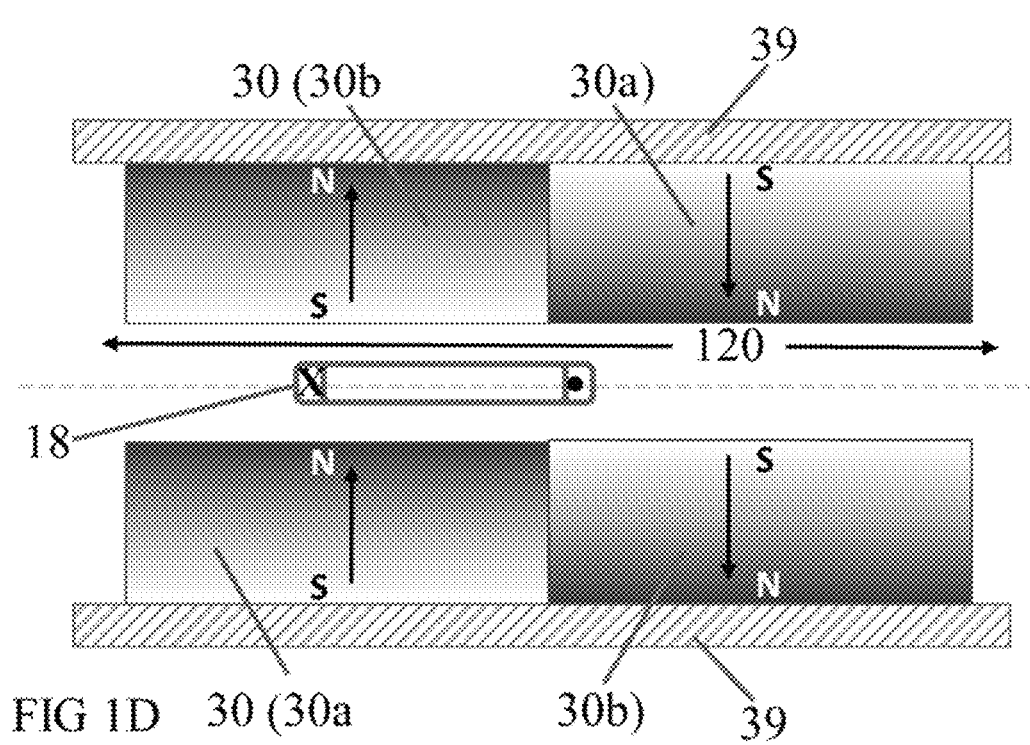
FIG. 1D illustrates the side view of the magnet design utilized in the magnet component for VCM as utilized in current hard disk drive.

FIG. 1D illustrates the back view of the magnetic design of the permanent magnets utilized in the magnet component for VCM as utilized in current hard disk drive. The soft magnetic yoke 39 is directly connected with the permanent magnet block 30, where the permanent magnet block 30 consists of two pieces of permanent magnet 30a and 30b, with magnetization direction to be opposite to each other, which can be glued together to form one piece. Thus, a magnetic field flux closure path is established between two permanent magnet blocks 30. The current (i) flows through the VCM coil 18 within the magnetic field generated by the permanent magnet block 30. Accordingly, thrust is applied to the VCM coil 18. By changing the direction of the current, the thrust direction can be changed and thus lead to rotation of the swing arm (21 in FIG. 1B, not shown here) that connected with the recording head assembly (13 in FIG. 1B, not shown here) and the VCM coil 18. The permanent magnet block 30 utilized in this structure consists of two pieces of permanent magnet 30a and 30b, with magnetization directions to be opposite to each other. This permanent magnet block 30 and the soft magnetic yoke 39 together is the magnet component utilized in VCM, typically called VCM magnet. In each hard disk drive, two pieces VCM magnets are utilized. The solid arrow represents the magnetization direction within each piece of the permanent magnet.

In application such as in a hard disk drive, the VCM is operated within a small spacing. It is extremely difficult to improve the efficiency for a given form factor while at the same time to maintain the actuators rotation angle. Therefore, to date, the VCM magnet are based on this same structure for all hard disk drives. The only way to improve efficiency is to increase permanent magnet thickness or materials quality, both approaches incur a significant cost penalty while the benefit is limited.

Figure 2A:
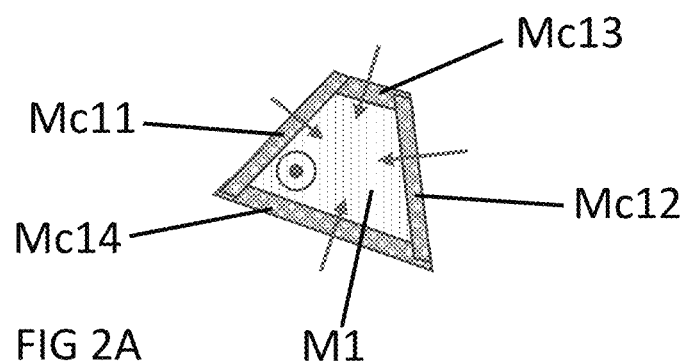
FIG. 2A illustrates the top view of one piece of magnet module of the composite permanent magnet as described in an embodiment of the invention.

FIG. 2A illustrates the top view of one piece of basic module of the composite permanent magnet as described in an embodiment of the invention. The basic module of the composite permanent magnet includes a core magnet M1 and one or more cladding magnet Mc11, Mc12, Mc13 and Mc14. The magnetization direction of the core magnet M1 is perpendicular to the magnet surface as seen from the top view. In this particular case, the magnetization direction is in the out of plane direction as labeled as a dot in a circle in FIG. 2A. The magnetization of the cladding magnet Mc11, Mc12, Mc13 and Mc14 is perpendicular or with an acute angle with respect to the magnetization direction of the core magnet M1. The shape of the core magnet can be in square, rectangular, trapezoid or fan shape as seen from the top view. The size of each piece of cladding layer is typically smaller than the core magnet.

Figure 2B:
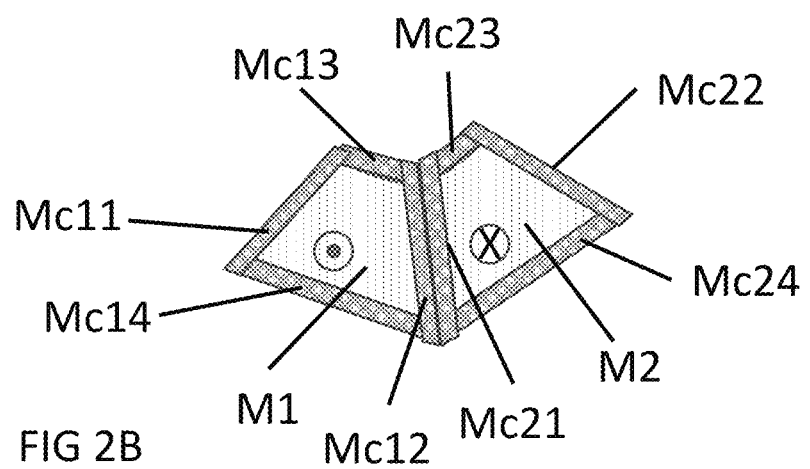
FIG. 2B illustrates the top view of a composite permanent magnet as described in an embodiment of the invention.

FIG. 2B illustrates the top view of a composite permanent magnet as described in an embodiment of the invention. The composite permanent magnet includes a pair of core magnets M1 and M2 and at least one of the core magnets has one or more cladding magnet selecting from Mc11, Mc12, Mc13, Mc14, Mc21, Mc22, Mc23 and Mc24. The magnetization direction of the core magnet M1 and M2 is perpendicular to the magnet surface as seen from the top view and opposite to each other. The magnetization directions are labeled as a dot and an X in a circle for M1 and M2 respectively in FIG. 2B, both are out of plane directions but opposite to each other. The magnetization of the cladding layer Mc11, Mc12, Mc13 and Mc14 is perpendicular or with an acute angle with respect to the magnetization direction of the core magnet next to it, here refers to as M1. The magnetization of the cladding layer Mc21, Mc22, Mc23 and Mc24 is perpendicular or with an acute angle with respect to the magnetization direction of the core magnet M2. The shape of the core magnet M1 and M2 can be in square, rectangular, trapezoid or fan shape as seen from the top view. The size of each piece of cladding layer is typically smaller than the core magnet.

Figure 3A:
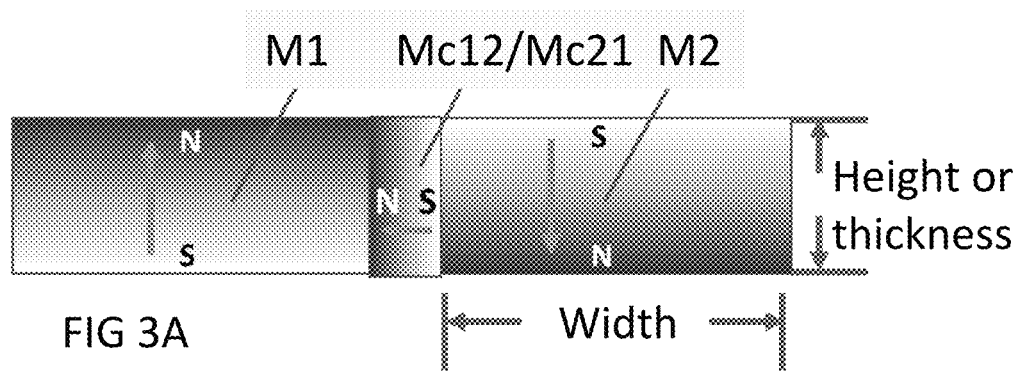
FIG. 3A illustrates the back view of a composite permanent magnet as described in an embodiment of the invention.

FIG. 3A illustrates the back view of a composite permanent magnet as described in an embodiment of the invention. A composite permanent magnet in accordance with the present description includes a first core magnet M1, a cladding magnet Mc12 and a second core magnet M2. The first core magnet M1 and the second core magnet M2 has the magnetization direction to be opposite to each other, and perpendicular to the composite permanent magnet surface as illustrated by the single line arrows inside the magnet. The cladding magnet Mc12 has the magnetization direction substantially perpendicular to the magnetization direction of M1 and M2. Each pieces of magnet M1, Mc12 and M2 can be glued together, or be placed separately next to each other. The width of the magnet as seen from the back view and the height or the thickness of the magnet are defined and illustrated in FIG. 3A. The width of the core magnet M1 and M2 is larger than the width of the cladding magnet Mc12. In this particular embodiment, one piece of cladding magnet Mc12 is placed between core magnet M1 and M2. Therefore, it can be considered as part of the composite magnet with core magnet M1, such as labeled as Mc12; or it can also be considered as part of the composite magnet with core magnet M2, labeled as Mc21. In this particular application, one cladding magnet can be labeled either as Mc12 or Mc21. In a preferred embodiment, the height or the thickness of the core magnet and cladding magnet as illustrated in FIG. 3A are same. The N and S represent the magnetic north and south pole of each of the permanent magnet M1, Mc12 and M2, along with the single line arrow illustrate the magnetization direction of each piece of the permanent magnet M1, Mc12 and M2 respectively.

Figure 3B:
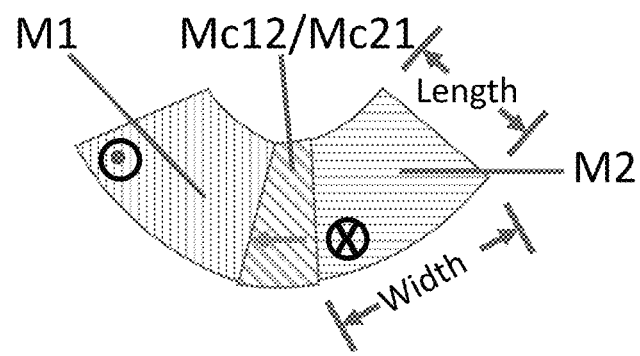
FIG. 3B illustrates the top view of a composite permanent magnet as described in an embodiment of the invention.

FIG. 3B illustrates the top view of a composite permanent magnet as described in an embodiment of the invention. A composite permanent magnet in accordance with the present description includes a first core magnet M1, a cladding magnet Mc12 and a second core magnet M2. Each piece of magnet M1, Mc12 and M2 can be glued together, or be placed separately next to each other. The shape of the magnet M1, Mc12 or M2 can be in fan shape or a trapezoid as seen from the top view. The width of the magnet and the length of the magnet are defined and illustrated in FIG. 3B. In one of the preferred embodiments, M1 and M2 have approximately the same size as seen from the top view. The Mc12 width and size is smaller than the width and the size of M1 and M2. Since there is one cladding magnet placed between two core magnet M1 and M2, the cladding magnet can be labeled either as Mc12 or Mc21.

Figure 3C:
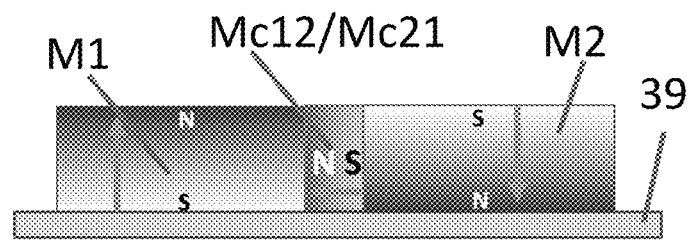
FIG. 3C illustrates the back view of a composite permanent magnet and the soft magnetic yoke to form a magnet component as described in an embodiment of the invention.

FIG. 3C illustrates the back view of a composite permanent magnet and the soft magnetic yoke to form a magnet component as described in an embodiment of the invention. A composite permanent magnet in accordance with the present description includes a first core magnet M1, a cladding magnet Mc12 (or Mc21), and a second core magnet M2. The first core magnet M1 and the second core magnet M2 has the magnetization direction to be opposite to each other, and perpendicular to the composite permanent magnet surface as illustrated by the single line arrows. The cladding magnet Mc12 has magnetization direction substantially perpendicular to the magnetization direction of M1 and M2. Each piece of magnet M1, Mc12 and M2 can be glued together, or be placed separately next to each other. In this embodiment, M1, Mc12 and M2 are glued together, and attach to the soft magnetic yoke 39 to form a composite magnet component that can be used as the VCM magnet. In one of the preferred embodiments, M1 and M2 have approximately the same width and the size as seen from the back view. The cladding magnet Mc12 width and size is smaller than the width and the size of M1 and M2. The N and S represent the magnetic north and south poles of each of the permanent magnet M1, Mc12 and M2, along with the single line arrow illustrate the magnetization direction of each piece of permanent magnet M1, Mc12 and M2.

Figure 3D:
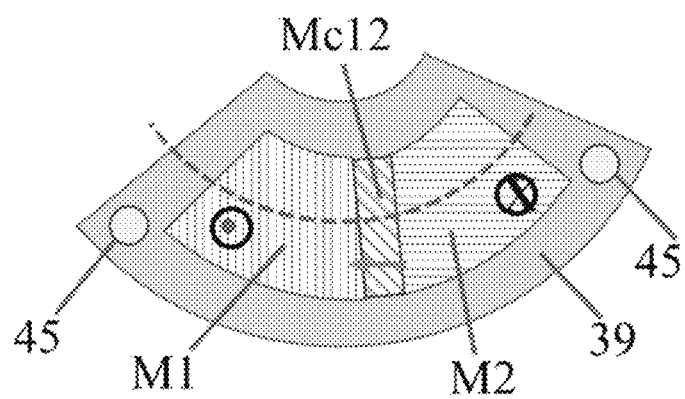
FIG. 3D illustrates the top view of a composite permanent magnet and the soft magnetic yoke to form a magnet component as described in an embodiment of the invention.

FIG. 3D illustrates the top view of a composite permanent magnet and the soft magnetic yoke to form a composite magnet component as described in an embodiment of the invention. A composite permanent magnet in accordance with the present description includes a first core magnet M1, a cladding magnet Mc12 and a second core magnet M2. Each piece of magnet M1, Mc12 and M2 can be glued together, or be placed separately next to each other. The shape of the magnet M1, Mc12 or M2 can be in fan shape, trapezoid shape, rectangle shape or other shapes based on application need, as seen from the top view. In one of the preferred embodiments, M1 and M2 have approximately the same width and the size as seen from the top view. The Mc12 width and size is smaller than the width and the size of M1 and M2. The composite permanent magnet is attached to the soft magnetic yoke 39. The soft magnetic yoke 39 further includes predrilled mounting holes 45. The magnetization direction of M1 and M2 is opposite to each other. The magnetization direction of Mc12 is substantially perpendicular to the magnetization direction of M1 and M2.

Figure 3E:
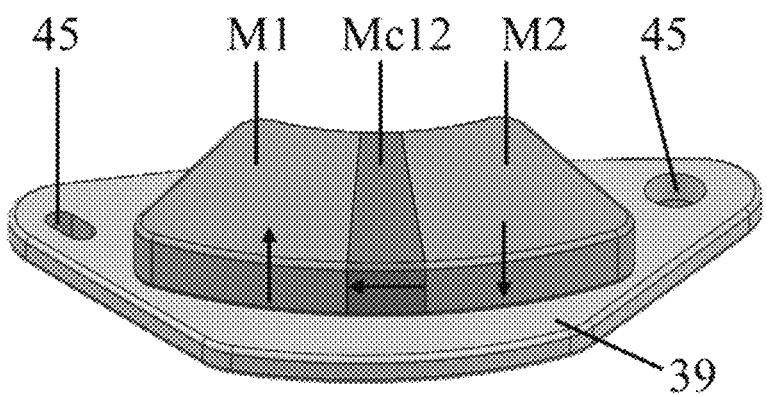
FIG. 3E illustrates the top back view of a composite permanent magnet and the soft magnetic yoke to form a magnet component as described in an embodiment of the invention.

FIG. 3E illustrates the top back view of a composite permanent magnet and the soft magnetic yoke to form a composite magnet component as described in an embodiment of the invention. A composite permanent magnet in accordance with the present description includes a first core magnet M1, a cladding magnet Mc12 and a second core magnet M2. Each piece of magnet M1, Mc12 and M2 can be glued together, or be placed separately next to each other. The shape of the magnet M1, Mc12 or M2 can be in fan shape, trapezoid shape or other shapes based on application need, as seen from the top view. In one of the preferred embodiments, M1 and M2 have approximately the same width and the size as seen from the top view. The magnetization of M1 and M2 are opposite to each other and substantially perpendicular to the composite magnet top surface as illustrated by the arrow in FIG. 3E. The Mc12 width and size is smaller than the width and the size of M1 and M2. The magnetization of Mc12 is substantially perpendicular to the magnetization direction of M1 and M2, as illustrated by the arrow in FIG. 3E. The composite permanent magnet is attached to the soft magnetic yoke 39. The soft magnetic yoke 39 further includes predrilled mounting holes 45. In an embodiment, the width to height ratio of the Mc12 as seen from the back view is less than 2:1. A small width of Mc12 will help to improve magnetic field and magnetic flux gradient for a given confined space. In addition, unlike other approaches, this composite structure will reduce total flux and flux density goes into the soft magnetic yoke. Instead of increase permanent magnet thickness, this approach allow smaller soft magnetic yoke thickness to be utilized if necessary. In practice, thicker yoke may still be utilized to help to further improve the efficiency of VCM magnet using the composite permanent magnet component.

This composite permanent magnet provides higher magnetic field or magnetic flux density that can be collected by the voice coil. Since the efficiency of the VCM is proportional to the magnetic field gradient. The magnetic field from the composite permanent magnet is higher than conventional permanent magnet currently utilized in hard disk drive, i.e., the baseline configuration. For the same size, shape, composition, saturation magnetization of the permanent magnet materials utilized in both cases, and the composite permanent magnet benefits can be clearly demonstrated as compare to the baseline, where the baseline is illustrated in FIG. 1C.

Figure 3F:
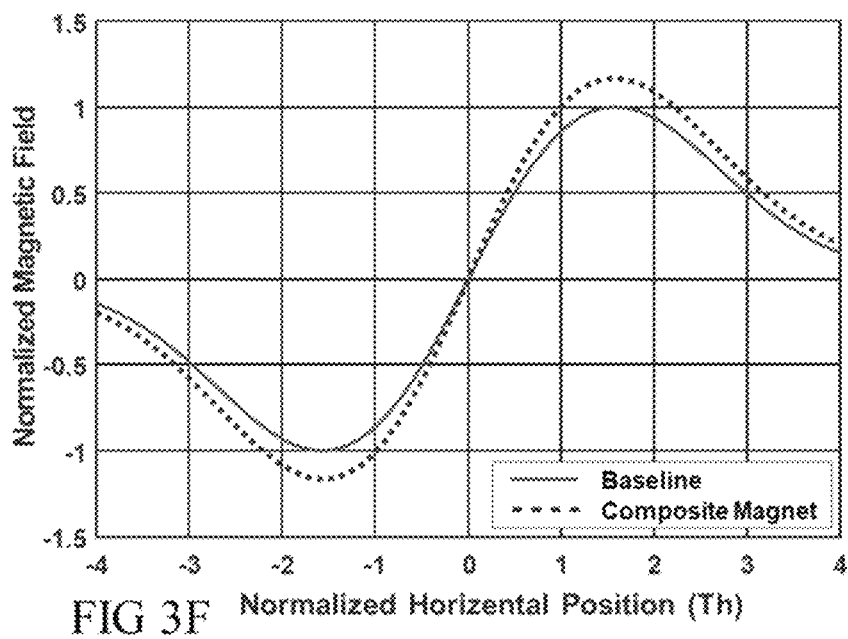
FIG. 3F illustrates the normalized magnetic field comparison along a fixed distance away from the magnet surface for composite permanent magnet vs. conventional magnet as utilized in a hard disk drive.

FIG. 3F illustrates the normalized magnetic field comparison along a fixed distance away from the magnet surface for composite permanent magnet vs. conventional magnet as utilized in a hard disk drive. The total size, shape, weight and composition of each magnet utilized for the composite permanent magnet and the conventional permanent magnet block are the same. The location of the magnetic field is along the dashed line in the top-down view in FIG. 3D and the back view in FIG. 1D, with two VCM magnets placed in such a way to measure the magnetic field at the location corresponding to the voice coil 18 in FIG. 1D. In other words, the horizontal axis represents the perpendicular magnetic field calculated along the tangential direction corresponding to the center of the VCM coil. In both cases, the total magnet width, height (thickness) and length are identical. The composite permanent magnet and the conventional magnet uses the same materials. The results show that the composite permanent magnet solution provide 20% additional field and field gradient for any horizontal position from −1.5 th to 1.5 th, where th is the thickness or the height of the magnet. This difference will directly translate to 20% additional torque for same voice coil current, which will increase VCM efficiency by 20%, reduce energy consumption or improve hard disk drive seek time.

Figure 4A:
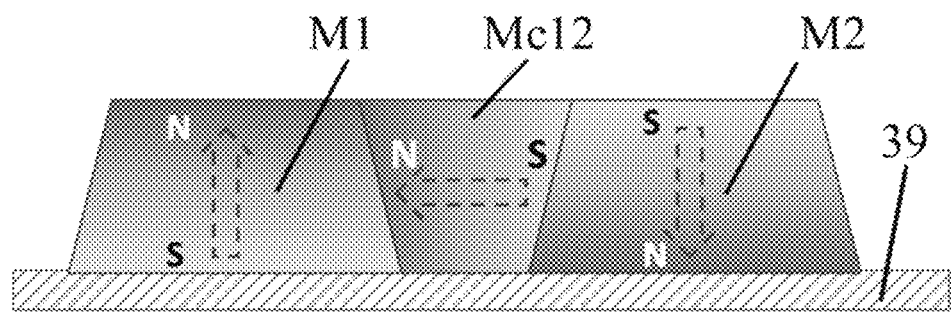
FIG. 4A illustrates the back view of a composite permanent magnet and the soft magnetic yoke to form a magnet component as described in another embodiment of the invention.

FIG. 4A illustrates the back view of a composite permanent magnet and the soft magnetic yoke to form a magnet component as described in another embodiment of the invention. A composite permanent magnet in accordance with the present description includes a first core magnet M1, a cladding magnet Mc12, and a second core magnet M2. The first core magnet M1 and the second core magnet M2 has the magnetization direction to be opposite to each other, and perpendicular to the composite permanent magnet surface as illustrated by the dashed line arrows. The cladding magnet Mc12 has the magnetization direction substantially perpendicular to the magnetization direction of M1 and M2. Each piece of magnet M1, Mc12 and M2 can be glued together, or be placed separately, next to each other. The shape of the composite permanent magnet can be in trapezoid shape and the shape of each piece of permanent magnet M1, Mc12 and M2 can also be in trapezoid shape as seen from the back view. Here the width of the magnet is defined as the width of (the long edge+the short edge)/2 of the trapezoid. In one of the preferred embodiments, M1 and M2 have approximately the same width and the size as seen from the back view. The Mc12 width and size is smaller than the width and the size of M1 and M2. The N and S represent the magnetic north and south pole of each permanent magnet M1, Mc12 and M2, along with the dashed line arrows illustrate the magnetization direction of each piece of the permanent magnet M1, Mc12 and M2.

Figure 4B:
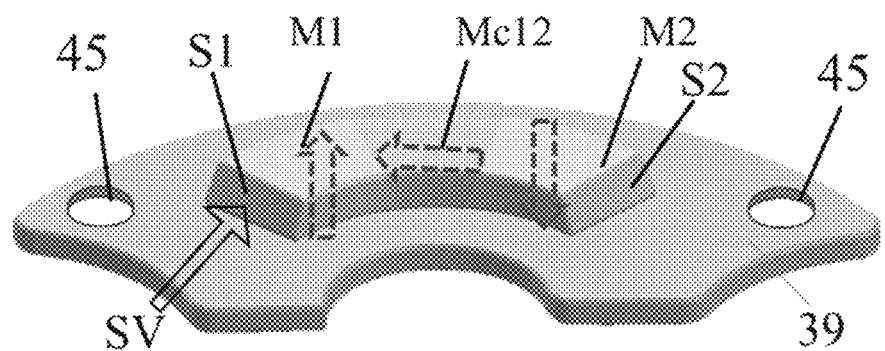
FIG. 4B illustrates the front top view of a composite permanent magnet and the soft magnetic yoke to form a magnet component as described in another embodiment of the invention.

FIG. 4B illustrates the front top view of a composite permanent magnet and the soft magnetic yoke to form a magnet component as described in another embodiment of the invention. A composite permanent magnet in accordance with the present description includes a first core magnet M1, a cladding magnet Mc12 and a second core magnet M2. The first core magnet M1 and the second core magnet M2 has the magnetization direction to be opposite to each other, and perpendicular to the composite permanent magnet surface as illustrated by the dashed line arrows. The cladding magnet Mc12 has magnetization direction substantially perpendicular to the magnetization direction of M1 and M2. Each piece of magnet M1, Mc12 and M2 can be glued together, or be placed separately, next to each other. The shape of the composite permanent magnet can be in trapezoid shape and the shape of each piece of permanent magnet M1, Mc12 or M2 can also be in trapezoid shape as seen from the back view. In one of the preferred embodiments, M1 and M2 have approximately the same width and the size as seen from the back view. The Mc12 width and size is smaller than the width and the size of M1 and M2. The shape of the magnet M1, Mc12 and M2 can be in fan shape, a square, a trapezoid or a rectangle shape as seen from the top view. In one of the preferred embodiments, M1 and M2 have approximately the same width and the size as seen from the top view. The cladding magnet Mc12 width and size is smaller than the width and the size of M1 and M2. With the trapezoid shape, the sloped surface such as S1 and S2 will provide additional magnetic field that can be sensed by the voice coil, further improve VCM efficiency. The height of M1, Mc12 and M2 is approximately same. The solid arrow represent the side view (SV) direction. In this embodiment, the composite permanent magnet has the side view cross section to be in rectangle shape. The composite permanent magnet is further attached to the soft magnetic yoke 39, with predrilled mounting holes 45.

Figure 4C:
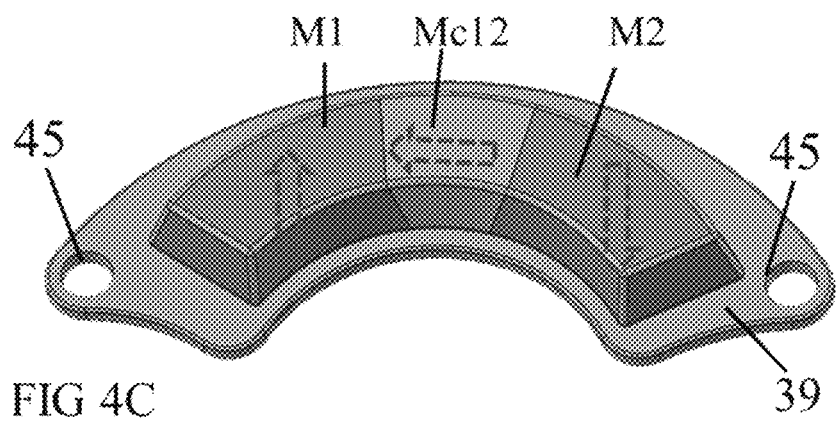
FIG. 4C illustrates the front top view of a composite permanent magnet and the soft magnetic yoke to form a magnet component as described in another embodiment of the invention.

FIG. 4C illustrates the front top view of a composite permanent magnet and the soft magnetic yoke to form a magnet component as described in another embodiment of the invention. A composite permanent magnet in accordance with the present description includes a first core magnet M1, a cladding magnet Mc12 and a second core magnet M2. The first core magnet M1 and the second core magnet M2 has the magnetization direction to be opposite to each other, and perpendicular to the composite permanent magnet surface as illustrated by the dashed line arrows. The cladding magnet Mc12 has magnetization direction substantially perpendicular to the magnetization direction of M1 and M2. Each piece of magnet M1, Mc12 and M2 can be glued together, or be placed separately, next to each other. The shape of the composite permanent magnet can be in trapezoid shape and the shape of each piece of permanent magnet M1, Mc12 or M2 can also be in trapezoid shape as seen from the back view. In one of the preferred embodiments, M1 and M2 have approximately the same width and the size as seen from the back view. The Mc12 width and size is smaller than the width and the size of M1 and M2. The shape of the magnet M1, Mc12 and M2 can be in fan shape as seen from the top view. In one of the preferred embodiments, M1 and M2 have approximately the same width and the size as seen from the top view. The Mc12 width and size is smaller than the width and the size of M1 and M2. The shape of the magnet can be in trapezoid shape as seen from the back view. With the trapezoid shape, the sloped surface will provide additional magnetic flux that can be sensed by the voice coil, further improve VCM efficiency. The height of M1, Mc12 and M2 is approximately same. In this embodiment, the composite permanent magnet has the side view cross section to be in trapezoid shape. The composite permanent magnet is further attached to the soft magnetic yoke 39, with predrilled mounting holes 45.

Figure 4D:
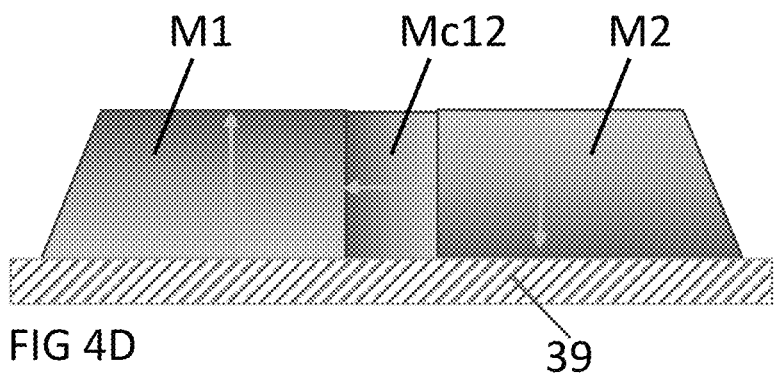
FIG. 4D illustrates the back view of a composite permanent magnet and the soft magnetic yoke to form a magnet component as described in another embodiment of the invention.

FIG. 4D illustrates the back view of a composite permanent magnet and the soft magnetic yoke to form a composite magnet component as described in another embodiment of the invention. A composite permanent magnet in accordance with the present description includes a first core magnet M1, a cladding magnet Mc12 and a second core magnet M2. The arrows illustrate the magnetization direction of each piece of permanent magnet M1, Mc12 and M2. The first core magnet M1 and the second core magnet M2 have the magnetization direction to be opposite to each other, and perpendicular to the composite permanent magnet surface. The cladding magnet Mc12 (also refers to Mc21) has the magnetization direction substantially perpendicular to the magnetization direction of M1 and M2. Each piece of magnet M1, Mc12 and M2 can be glued together, or be placed separately next to each other. The shape of the composite permanent magnet can be in trapezoid shape. The shape of each piece of permanent magnet M1, Mc12 or M2 can be in trapezoid or rectangle shape as seen from the back view. In one of the preferred embodiments, M1 and M2 have approximately the same width and the size as seen from the back view. The Mc12 width and size is smaller than the width and the size of M1 and M2. In this particular embodiment, M1 and M2 are with trapezoid shape as seen from the back view. Mc12 has the rectangle shape as seen from the back view.

Figure 4E:
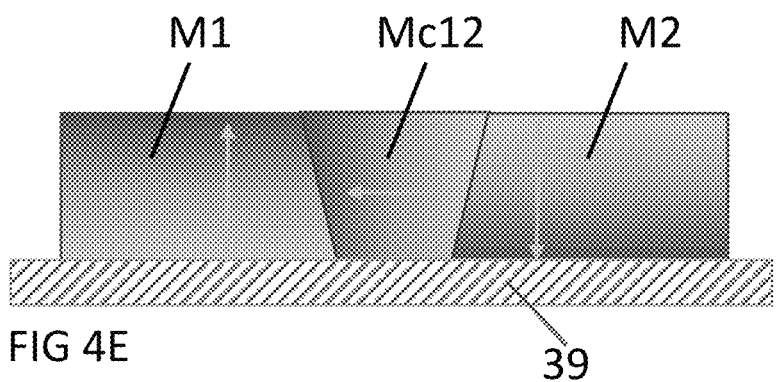
FIG. 4E illustrates the back view of a composite permanent magnet and the soft magnetic yoke to form a magnet component as described in another embodiment of the invention.

FIG. 4E illustrates the back view of a composite permanent magnet and the soft magnetic yoke to form a magnet component as described in another embodiment of the invention. A composite permanent magnet in accordance with the present description includes a first core magnet M1, a cladding magnet Mc12 and a second core magnet M2. The arrows illustrate the magnetization direction of each piece of the permanent magnet M1, Mc12 and M2. The first core magnet M1 and the second core magnet M2 has the magnetization direction to be opposite to each other, and perpendicular to the composite permanent magnet surface. The cladding magnet Mc12 (also refers to as Mc21) has the magnetization direction substantially perpendicular to the magnetization direction of M1 and M2. Each piece of magnet M1, Mc12 and M2 can be glued together, or be placed separately next to each other. The shape of the composite permanent magnet can be in trapezoid shape or fan shape. The shape of each piece of permanent magnet M1, Mc12 or M2 can be in trapezoid or rectangle shape as seen from the back view. In one of the preferred embodiments, M1 and M2 have approximately the same width and the size as seen from the back view. The cladding magnet Mc12 width and size is smaller than the width and the size of M1 and M2. In this particular embodiment, M1, Mc12 and M2 are with trapezoid shape as seen from the back view.

Figure 5A:
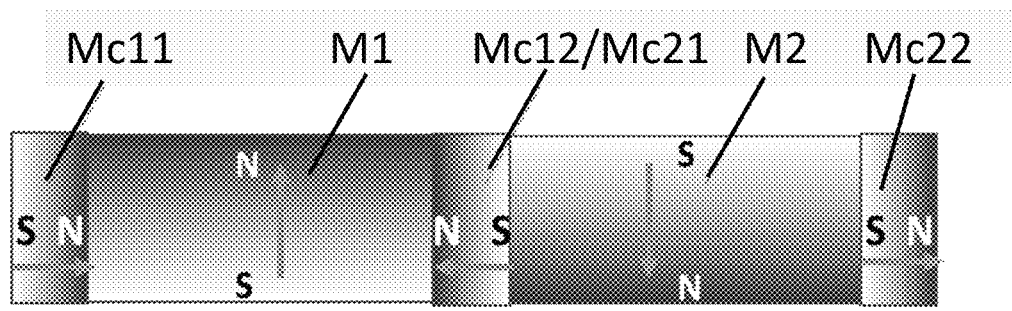
FIG. 5A illustrates the back view of a composite permanent magnet as described in another embodiment of the invention.

FIG. 5A illustrates the back view of a composite permanent magnet as described in another embodiment of the invention. A composite permanent magnet in accordance with the present description includes a first cladding magnet Mc11, a first core magnet M1, a second cladding magnet Mc12 (also refers to as Mc21), a second core magnet M2 and a third cladding magnet Mc22. The magnetization direction of M1 and M2 is opposite to each other and perpendicular to the composite permanent magnet surface as illustrated by the single line arrows. The second cladding magnet Mc12 has magnetization direction substantially perpendicular to the magnetization direction of M1 and M2. In an embodiment, M1 and M2 in the composite permanent magnet have the size and shape to be same or close to each other. The first cladding magnet Mc11 and the third cladding magnet Mc22 have the magnetization direction substantially perpendicular to the magnetization direction of M1 and M2. In an embodiment, the second cladding magnet Mc12 has magnetization direction to be opposite to the magnetization direction of the first cladding magnet Mc11 and the third magnet Mc22. Each piece of magnet in the composite permanent magnet are connected to each other. In an embodiment, the shape of each piece of magnet in the composite permanent magnet is in rectangle shape as seen from the back view.

Figure 5B:
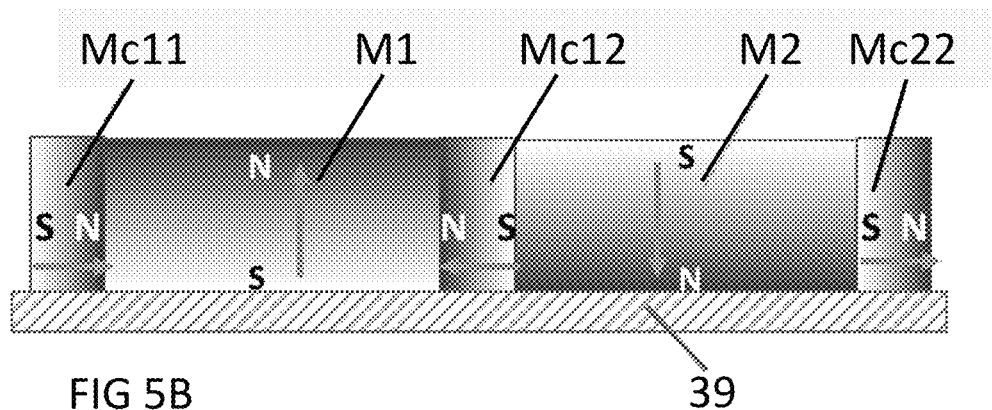
FIG. 5B illustrates the back view of a composite permanent magnet and the soft magnetic yoke to form a magnet component as described in another embodiment of the invention.

FIG. 5B illustrates the back view of a composite permanent magnet and the soft magnetic yoke to form a magnet component as described in another embodiment of the invention. A composite permanent magnet in accordance with the present description includes a first cladding magnet Mc11, a first core magnet M1, a second cladding magnet Mc12, a second core magnet M2 and a third cladding magnet Mc22. The first core magnet M1 and the second core magnet M2 have the magnetization direction to be opposite to each other and perpendicular to the composite permanent magnet surface as illustrated by the single line arrows. The second cladding magnet Mc12 has magnetization direction substantially perpendicular to the magnetization direction of M1 and M2. In an embodiment, the first magnet M1 and the second magnet M2 in the composite permanent magnet have the size and shape to be same or close to each other. The first cladding magnet Mc11 and the third cladding magnet Mc22 have the magnetization direction substantially perpendicular to the magnetization direction of the first core magnet M1 and the second core magnet M2. In addition, the second cladding magnet Mc12 has magnetization direction to be opposite to the magnetization direction of the first cladding magnet Mc11 and the third cladding magnet Mc22. Each piece of magnet in the composite permanent magnet are connected to each other. In an embodiment, the shape of each piece of magnet in the composite permanent magnet is in rectangle shape as seen from the back view. The composite permanent magnet is attached to the soft magnetic yoke 39.

Figure 6:
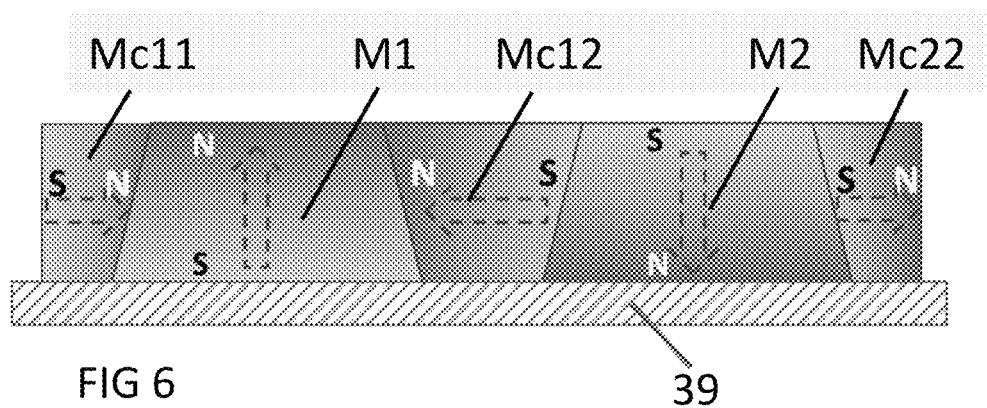
FIG. 6 illustrates the back view of a composite permanent magnet and the soft magnetic yoke to form a magnet component as described in another embodiment of the invention.

FIG. 6 illustrates the back view of a composite permanent magnet and the soft magnetic yoke to form a magnet component as described in another embodiment of the invention. A composite permanent magnet in accordance with the present description includes a first cladding magnet Mc11, a first core magnet M1, a second cladding magnet Mc12, a second core magnet M2 and a third cladding magnet Mc22. The first core magnet M1 and the second magnet M2 have the magnetization direction to be opposite to each other and perpendicular to the composite permanent magnet surface as illustrated by the dashed line arrows. The second cladding magnet Mc12 has magnetization direction substantially perpendicular to the magnetization direction of M1 and M2. In an embodiment, M1 and M2 in the composite permanent magnet have the size and shape to be same or close to each other. The first cladding magnet Mc11 and the third cladding magnet Mc22 have the magnetization direction substantially perpendicular to the magnetization direction of M1 and M2. In addition, the second cladding magnet Mc12 has magnetization direction to be opposite to the magnetization direction of the first cladding magnet Mc11 and the third cladding magnet Mc22. Each piece of magnet in the composite permanent magnet are connected to each other. In an embodiment, the shape of each piece of magnet in the composite permanent magnet is in trapezoid shape as seen from the back view. The composite permanent magnet is attached to the soft magnetic yoke 39.

Figure 7A:
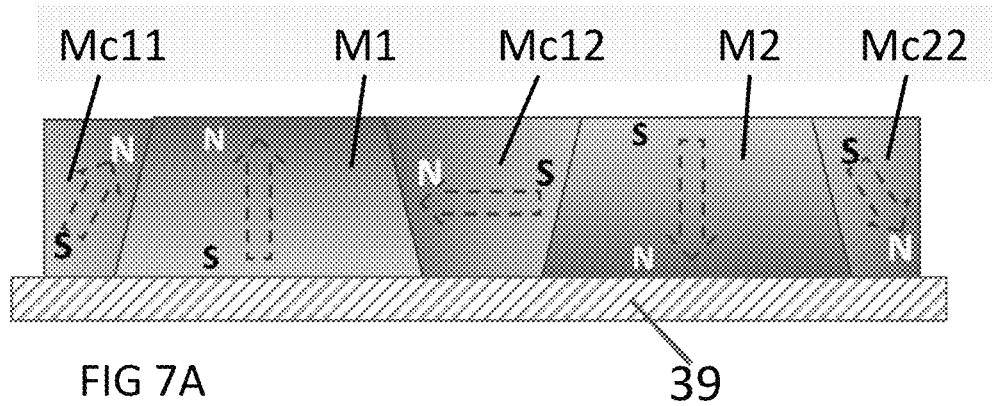
FIG. 7A illustrates the back view of a composite permanent magnet and the soft magnetic yoke to form a magnet component as described in another embodiment of the invention.

FIG. 7A illustrates the back view of a composite permanent magnet and the soft magnetic yoke to form a magnet component as described in another embodiment of the invention. A composite permanent magnet in accordance with the present description includes a first cladding magnet Mc11, a first core magnet M1, a second cladding magnet Mc12, a second core magnet M2 and a third cladding magnet Mc22. The first core magnet M1 and the second core magnet M2 have the magnetization direction to be opposite to each other and perpendicular to the composite permanent magnet surface as illustrated by the dashed line arrows. The second cladding magnet Mc12 has magnetization direction substantially perpendicular to the magnetization direction of M1 and M2. In an embodiment, M1 and M2 in the composite permanent magnet have the size and shape to be same or close to each other. The first cladding magnet Mc11 and the third cladding magnet Mc22 have the magnetization direction with an acute angle with respect to the magnetization direction of M1 and M2 respectively. Each piece of magnet in the composite permanent magnet are glued to each other. In an embodiment, the shape of each piece of magnet in the composite permanent magnet is in trapezoid shape as seen from the back view. The composite permanent magnet is attached to the soft magnetic yoke 39.

Figure 7B:
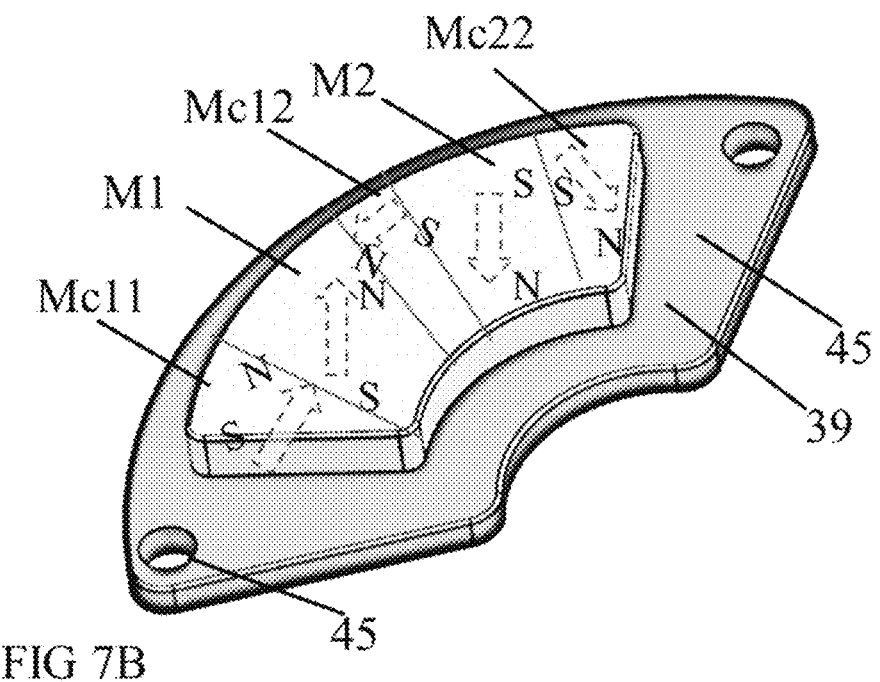
FIG. 7B illustrates the perspective view of a composite permanent magnet and the soft magnetic yoke to form a magnet component as described in another embodiment of the invention.

FIG. 7B illustrates another perspective view of a composite permanent magnet and the soft magnetic yoke to form a magnet component as described in another embodiment of the invention. A composite permanent magnet in accordance with the present description includes a first cladding magnet Mc11, a first core magnet M1, a second cladding magnet Mc12, a second core magnet M2 and a third cladding magnet Mc22. The first core magnet M1 and the second core magnet M2 have the magnetization direction to be opposite to each other and perpendicular to the composite permanent magnet surface as illustrated by the dashed line arrows. The second cladding magnet Mc12 has magnetization direction substantially perpendicular to the magnetization direction of M1 and M2. In an embodiment, M1 and M2 in the composite permanent magnet have the size and shape to be same or close to each other. The first cladding magnet Mc11 and the third cladding magnet Mc22 have the magnetization direction with an acute angle with respect to the magnetization direction of the first magnet M1 and the second magnet M2 respectively. Each piece of magnet in the composite permanent magnet are glued to each other. In an embodiment, the shape of each piece of magnet in the composite permanent magnet is in rectangle shape as seen from the back view. The composite permanent magnet is attached to the soft magnetic yoke 39. Wherein the soft magnetic yoke 39 further includes mounting holes 45.

Figure 8:
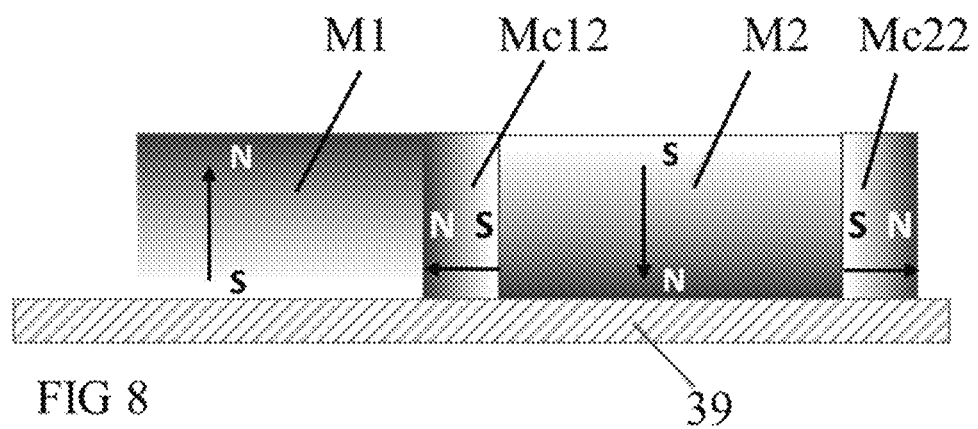
FIG. 8 illustrates the back view of a composite permanent magnet as described in another embodiment of the invention.

FIG. 8 illustrates the back view of the proposed composite permanent magnet as described in another embodiment of the invention. A composite permanent magnet in accordance with the present description includes a first core magnet M1, a first cladding magnet Mc12, a second core magnet M2 and a second cladding magnet Mc22. The first core magnet M1 and the second core magnet M2 have the magnetization direction to be opposite to each other and perpendicular to the composite permanent magnet surface as illustrated by the solid line arrows. The first cladding magnet Mc12 and the second cladding magnet Mc22 have magnetization direction substantially perpendicular to the magnetization direction of the first core magnet M1 and the second core magnet M2. In an embodiment, M1 and M2 in the composite permanent magnet have the size and shape to be same or close to each other. The first cladding magnet Mc12 and the second cladding magnet Mc22 have the magnetization direction substantially perpendicular to the magnetization direction of M1 and M2. The first cladding magnet Mc12 has the magnetization direction to be opposite to the magnetization direction of the second cladding magnet Mc22. Each piece of magnet in the composite permanent magnet are connected to each other. In an embodiment, the shape of each piece of magnet in the composite permanent magnet is in rectangle shape as seen from the back view. In another embodiment, the composite permanent magnet further attach to the soft magnetic yoke 39.

Figure 9:
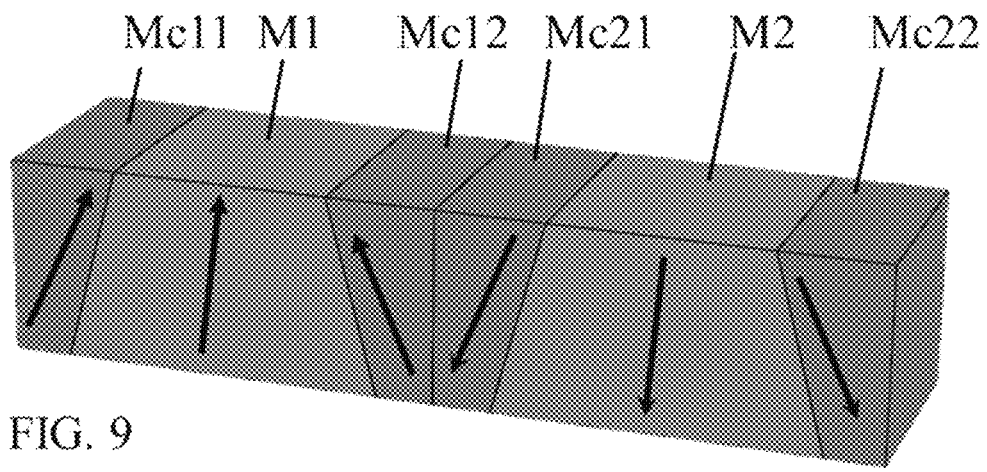
FIG. 9 illustrates a perspective view of a composite permanent magnet as described in another embodiment of the invention.

FIG. 9 illustrates a perspective view of a composite permanent magnet as described in another embodiment of the invention. The view direction is from top, back and side. A composite permanent magnet in accordance with the present description includes a first cladding magnet Mc11, a first core magnet M1, a second cladding magnet Mc12, a third cladding magnet Mc21, a second core magnet M2 and a fourth cladding magnet Mc22. The first core magnet M1 and the second core magnet M2 have the magnetization direction to be opposite to each other and perpendicular to the composite permanent magnet surface as illustrated by the solid line arrows. In an embodiment, the first core magnet M1 and the second core magnet M2 in the composite permanent magnet have the size and shape to be same or close to each other. The first cladding magnet Mc11 and the second cladding magnet Mc12 have the magnetization direction with an acute angle with respect to the magnetization direction of the first core magnet M1. The third cladding magnet Mc21 and the fourth cladding magnet Mc22 have the magnetization direction with an acute angle with respect to the magnetization direction of the second core magnet M2. In an embodiment, the shape of each piece of magnet in the composite permanent magnet is in rectangle shape as seen from the top view. The shape of each piece of magnet in the composite permanent magnet can be in rectangle shape or trapezoid shape as seen from the back view.

Figure 10:
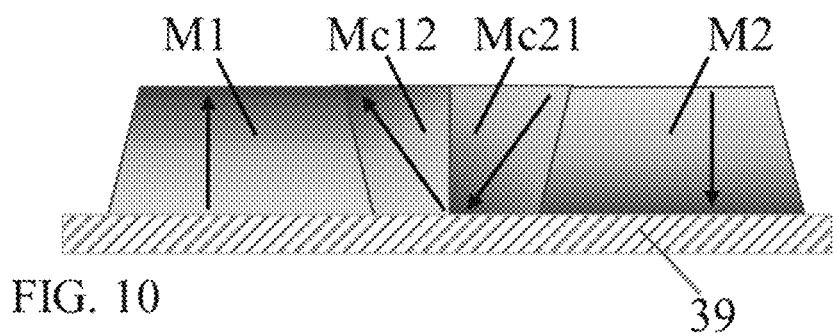
FIG. 10 illustrates the back view of a composite permanent magnet and the soft magnetic yoke to form a magnet component as described in another embodiment of the invention.

FIG. 10 illustrates the back view of a composite permanent magnet and the soft magnetic yoke to form a magnet component as described in another embodiment of the invention. A composite permanent magnet in accordance with the present description includes a first core magnet M1, a first cladding magnet Mc12, a second cladding magnet Mc21 and a second core magnet M2. The first core magnet M1 and the second core magnet M2 have the magnetization direction to be opposite to each other and perpendicular to the composite permanent magnet surface as illustrated by the arrows. The first cladding magnet Mc12 and the second cladding magnet Mc21 have magnetization direction with an acute angle with respect to the magnetization direction of the first core magnet M1 and the second core magnet M2 respectively. The composite permanent magnet is attached to the soft magnetic yoke 39. In an embodiment, the first core magnet M1 and the second core magnet M2 in the composite permanent magnet have the size and shape to be same or close to each other. The first cladding magnet Mc12 and the second cladding magnet Mc21 have the magnetization direction with an acute angle with respect to the magnetization direction of the first core magnet M1 and the second core magnet M2 respectively. Each piece of magnet in the composite permanent magnet are connected to each other. In an embodiment, the shape of each piece of magnet in the composite permanent magnet is in trapezoid shape as seen from the back view.

Figure 11:
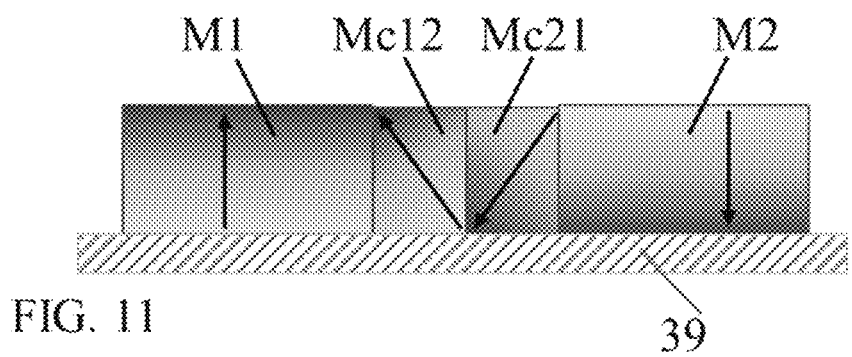
FIG. 11 illustrates the back view of a composite permanent magnet and the soft magnetic yoke to form a magnet component as described in another embodiment of the invention.

FIG. 11 illustrates the back view of a composite permanent magnet and the soft magnetic yoke to form a magnet component as described in another embodiment of the invention. A composite permanent magnet in accordance with the present description includes a first core magnet M1, a first cladding magnet Mc12, a second cladding magnet Mc21 and a second core magnet M2. The first core magnet M1 and the second core magnet M2 have the magnetization direction to be opposite to each other and perpendicular to the composite permanent magnet surface as illustrated by the arrows. The first cladding magnet Mc12 and the second cladding magnet Mc21 have magnetization direction with an acute angle with respect to the magnetization direction of the first core magnet M1 and the second core magnet M2 respectively. The composite permanent magnet is attached to the soft magnetic yoke 39. In an embodiment, the first core magnet M1 and the second core magnet M2 in the composite permanent magnet have the size and shape to be same or close to each other. The first cladding magnet Mc12 and the second cladding magnet Mc21 have the magnetization direction with an acute angle with respect to the magnetization direction of the first core magnet M1 and the second core magnet M2 respectively. Each piece of magnet in the composite permanent magnet are connected to each other. In an embodiment, the shape of each piece of magnet in the composite permanent magnet is in rectangle shape as seen from the back view.

Figure 12A:
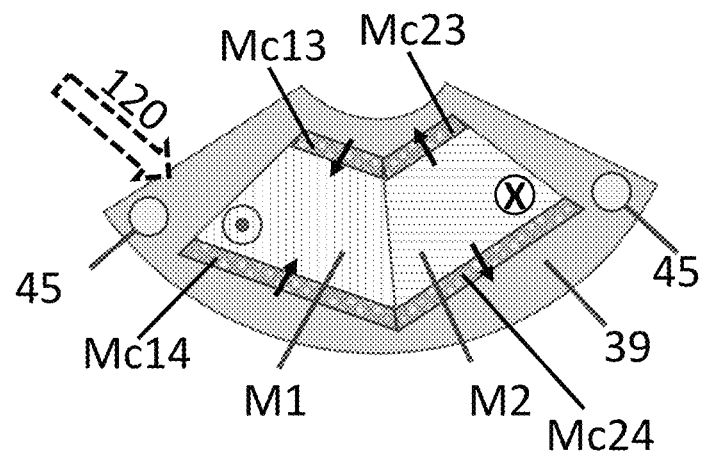
FIG. 12A illustrates the top view of a composite permanent magnet and the soft magnetic yoke to form a magnet component as described in another embodiment of the invention.

FIG. 12A illustrates the top view of a composite permanent magnet and the soft magnetic yoke to form a magnet component as described in an embodiment of the invention. A composite permanent magnet in accordance with the present description includes a first core magnet M1 and a second core magnet M2, that can be placed together, next to each other or glued together. Where the core magnets M1 and M2 have the magnetization direction opposite to each other and perpendicular to the composite magnet surface or the soft magnet yoke surface. From the top view, the magnetization of M1 and M2 are either pointing into or out of FIG. plane as shown in FIG. 12A, or along the actuator axial direction. Wherein each piece of the core magnet M1 and M2 are further with a composite structure that has cladding magnets Mc13 and Mc14, Mc23 and Mc24 respectively. The magnetization direction of the cladding magnet Mc13, Mc14, Mc23 and Mc24 is perpendicular or with an acute angle with respect to the magnetization direction of M1 and M2 respectively, either pointing towards or pointing away from the core magnet M1 and M2. The solid arrows and the circle sign with a dot or x in the middle represents the magnetization direction in each piece of magnet. The dashed arrow 120 illustrates the side view direction of the composite magnet as it will be illustrated in FIGS. 12B, 12C and 12D. The composite magnet is further placed on a soft magnetic yoke 39. The soft magnetic yoke 39 can be in any shape as required by the available space or product design requirement, typically has a flat fan shape with mounting holes 45.

In one of the preferred embodiments, M1 and M2 have approximately the same width and size as seen from the top view. The Mc11, Mc12, Mc21 and Mc22 size is smaller than the size of M1 and M2 respectively. The composite permanent magnet is attached to the soft magnetic yoke 39. The soft magnetic yoke 39 further includes predrilled mounting holes 45. This composite permanent magnet provides higher magnetic field or flux density that can be collected by the voice coil. The magnetic field from the composite permanent magnet is higher than the baseline where conventional permanent magnet is currently utilized.

Figure 12B:
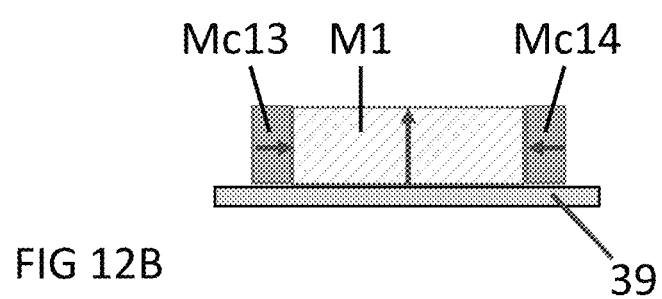
FIG. 12B illustrates the side view of one piece of composite permanent magnet surface and the soft magnetic yoke to form a magnet component as described in another embodiment of the invention.

FIG. 12B illustrates the side view of a composite permanent magnet and the soft magnetic yoke to form a composite magnet component as described in another embodiment of the invention. A composite permanent magnet first core magnet M1 further includes cladding magnet Mc13 and Mc14 that can be placed together, next to each other or glued together along the other (the radial) direction. As illustrated by the solid arrows, the magnetization direction of Mc13 and Mc14 is substantially perpendicular to the magnetization direction of M1. The magnetization direction of M1 is in out of plane direction or the axial direction with respect to the M1 surface, as illustrated by the solid arrow in FIG. 12B. The composite magnet is placed on top of the soft magnetic yoke 39.

Figure 12C:
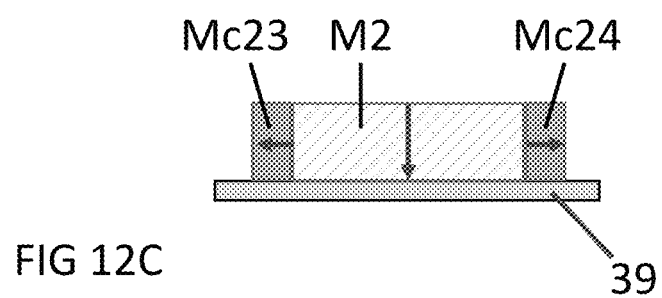
FIG. 12C illustrates the side view of the other piece of composite permanent magnet surface and the soft magnetic yoke to form a magnet component as described in another embodiment of the invention.

FIG. 12C illustrates the side view of another piece of composite permanent magnet and the soft magnetic yoke to form a composite magnet component as described in another embodiment of the invention. A composite permanent magnet second core magnet M2 further includes cladding magnet Mc23 and Mc24 that can be placed together, next to each other or glued together along the other (the radial) direction. As illustrated by the solid arrows, the magnetization direction of Mc23 and Mc24 is substantially perpendicular to the magnetization direction of M2. The magnetization direction of M2 is pointing into the plane direction with respect to the M2 surface, as illustrated by the solid arrow in FIG. 12C.

The composite magnet is placed on top of the soft magnetic yoke 39. In practice M1 and M2 can be glued together.

Figure 12D:
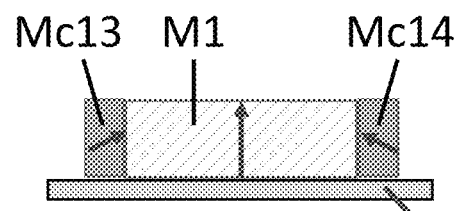
FIG. 12D illustrates the side view of one piece of composite permanent magnet surface and the soft magnetic yoke to form a magnet component as described in another embodiment of the invention.

FIG. 12D illustrates the side view of a composite permanent magnet and the soft magnetic yoke to form a composite magnet component as described in another embodiment of the invention. A composite permanent magnet first core magnet M1 further includes cladding magnet Mc13 and Mc14 that can be placed together, next to each other or glued together along the other (the radial) direction. As illustrated by the solid arrows, the magnetization direction of Mc13 and Mc14 is with an acute angle with respect to the magnetization direction of M1. The magnetization direction of M1 is in the out of plane direction with respect to the M1 surface, as illustrated by the solid arrow in FIG. 12D. The composite magnet is placed on top of the soft magnetic yoke 39.

Figure 12E:
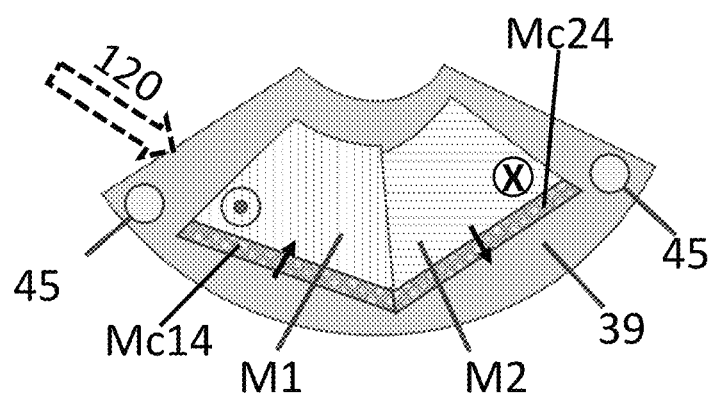
FIG. 12E illustrates the top view of a composite permanent magnet and the soft magnetic yoke to form a magnet component as described in another embodiment of the invention.

FIG. 12E illustrates the top view of a composite permanent magnet and the soft magnetic yoke to form a composite magnet component as described in another embodiment of the invention. A composite permanent magnet in accordance with the present description includes a first core magnet M1 and a second core magnet M2, that can be placed together, next to each other or glued together. Wherein the core magnet M1 and M2 have the magnetization direction opposite to each other and perpendicular to the magnet surface or the soft magnet yoke surface. From the top view, the magnetization of M1 and M2 are either pointing into or out of FIG. plane as shown in FIG. 12E, or in the axial direction if considering the overall soft magnetic yoke is in a fan shape as defined earlier. Wherein each piece of core magnet M1 or M2 are further with a composite structure that has cladding magnet Mc14 and Mc24 respectively. The magnetization direction of the cladding magnet Mc14 and Mc24 is perpendicular or with an acute angle with respect to the magnetization direction of M1 and M2 respectively, either pointing towards the core magnet or pointing away from the core magnet M1 and M2. The solid arrows and the circle sign with a dot or x in the middle represents the magnetization direction in each piece of magnet. The dashed arrow 120 illustrates the side view direction of the composite magnet as it will be illustrated in FIGS. 12F and 12G. The composite magnet is further placed on a soft magnetic yoke 39. The soft magnetic yoke 39 can be in any shape as required by the available space or by product design requirement, typically has a flat fan shape with mounting holes 45. In one of the preferred embodiments, M1 and M2 have approximately the same width and the size as seen from the top view. The cladding magnet Mc14 and Mc24 size is smaller than the size of M1 and M2. The composite permanent magnet is attached to the soft magnetic yoke 39. The soft magnetic yoke 39 further includes pre drilled mounting holes 45.

Figure 12F:
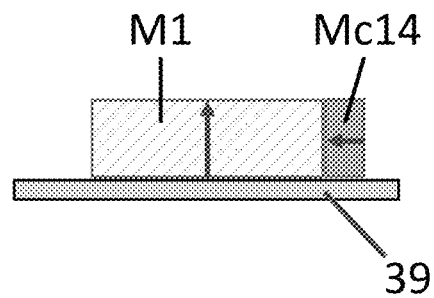
FIG. 12F illustrates the side view of one piece of composite permanent magnet surface and the soft magnetic yoke to form a magnet component as described in another embodiment of the invention.

FIG. 12F illustrates the side view of a composite permanent magnet and the soft magnetic yoke to form a composite magnet component as described in another embodiment of the invention. A composite permanent magnet has a first core magnet M1 and a cladding magnet Mc14 that can be placed together, next to each other or glued together along the other (the radial) direction. As illustrated by the solid arrows, the magnetization direction of Mc14 is substantially perpendicular to the magnetization direction of M1. The magnetization direction of M1 is in out of plane direction with respect to M1 surface, as illustrated by the solid arrow. The composite magnet is placed on top of the soft magnetic yoke 39. In practice M1 and its cladding magnet Mc14 can be glued together.

Figure 12G:
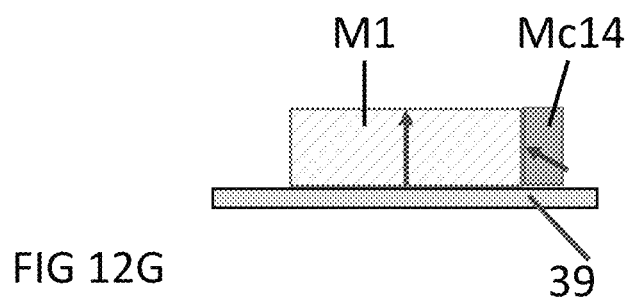
FIG. 12G illustrates the side view of the other piece of composite permanent magnet surface and the soft magnetic yoke to form a magnet component as described in another embodiment of the invention.

FIG. 12G illustrates the side view of a composite permanent magnet and the soft magnetic yoke to form a composite magnet component as described in another embodiment of the invention. A composite permanent magnet includes a first core magnet M1 and a cladding magnet Mc14 that can be placed together, next to each other or glued together along the other (the radial) direction. As illustrated by the solid arrows, the magnetization direction of Mc14 is with an acute angle with respect to the magnetization direction of M1. The magnetization direction of M1 is in out of plane direction with respect to M1 surface, as illustrated by the solid arrow in FIG. 12G. The composite magnet M1 is placed on top of the soft magnetic yoke 39. In practice M1 and its cladding magnet Mc14 can be glued together.

Figure 13:
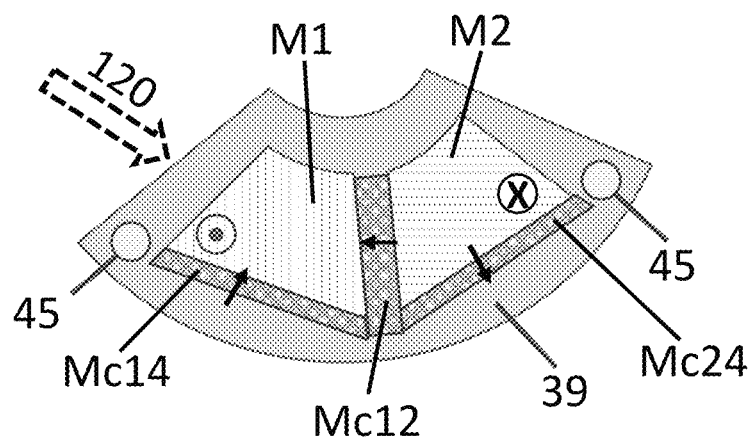
FIG. 13 illustrates the top view of a composite permanent magnet and the soft magnetic yoke to form a magnet component as described in another embodiment of the invention.

FIG. 13 illustrates the top view of a composite permanent magnet and the soft magnetic yoke to form a magnet component as described in another embodiment of the invention. A composite permanent magnet in accordance with the present description includes a first core magnet M1 and a second core magnet M2. The first core magnet M1 and the second core magnet M2 have the magnetization direction to be opposite to each other, and perpendicular to the composite permanent magnet surface. The first core magnet further includes cladding magnet Mc12 and Mc14, and the second core magnet M2 has cladding magnet Mc24. The magnetization direction of cladding magnets Mc12, Mc14 and Mc24 are substantially perpendicular to or with an acute angle with respect to the magnetization direction of the first core magnet M1 and the second core magnet M2. Each piece of magnet M1, M2, Mc14, Mc12 and Mc24 can be glued together, or be placed separately, next to each other. The solid arrows and the circle sign with a dot or x in the middle represents the magnetization direction in each piece of magnet. The dashed arrow 120 illustrates the side view direction of the composite magnet. The composite magnet is further placed on a soft magnetic yoke 39. The soft magnetic yoke 39 can be in any shape as required by the available space or product design requirement, typically has a flat fan shape with mounting holes 45.

The shape of the composite permanent magnet can be in fan shape or trapezoid shape and the shape of each piece of permanent magnet M1, M2, Mc12, Mc14 and Mc24 can also be in rectangle shape or trapezoid shape as seen from the back view. In one of the preferred embodiments, M1 and M2 have approximately the same width and size as seen from the back view. The Mc12 width and size is smaller than the width and size of M1 and M2. The height of M1, M2, Mc14, Mc24 and Mc12 is approximately same.

The above figures are examples of the individual composite permanent magnet that can be utilized in various applications, particular for hard disk drives utilize composite permanent magnet for VCM. In Various applications, multiple composite permanent magnets may be utilized with particular periodic pattern and with shapes and sizes to form magnet structures for high efficiency motors and generators to improve power density. The magnet components to form composite permanent magnet may not be all in rectangle shape, in some applications, as stated earlier, have fan shape, trapezoid shape or square shape as seen from the top view. In another embodiment, a hard disk drive includes composite permanent magnet as the VCM magnet where the VCM is operated via a set of VCM magnets. Where at least one VCM magnet includes a composite permanent magnet placed on the soft magnetic yoke. The composite permanent magnet can be in any of the configurations described above. In another embodiment, the two VCM magnets may not be in the same size and shape.

Furthermore, each piece of magnet in the composite permanent magnet may be a ferrite (such as Barium-Iron- Oxygen (Ba—Fe—O), Barium-Nickel-Iron-Oxygen (Ba—Ni—Fe—O), Barium-Strontium-Nickel-Iron-Oxygen (Ba—Sr—Ni—Fe—O), etc.), alnico (such as Aluminum-Nickel-Cobalt (Al—Ni—Co), Aluminum-Nickel-Cobalt-Iron (Al—Ni—Co—Fe), Aluminum-Nickel-Cobalt-Iron-Copper (Al—Ni—Co—Fe—Cu), etc.), rare earth-transition metal-based permanent magnetic materials X-Y or X-Y-Z (where X includes rare-earth elements and their combinations, such as Neodymium (Nd), Samarium (Sm), Gadolinium (Gd), Neodymium-Dysprosium (NdDy), Neodymium-Dysprosium-Terbium-Gadolinium (NdDyTbGd) and Neodymium-Dysprosium-Terbium (NdDyTb), etc.; Y includes transition metal elements and/or their combinations, such as Iron (Fe), Cobalt (Co), Manganese (Mn), Nickel (Ni), Iron-Cobalt (FeCo), Iron-Cobalt-Nickel (FeCoNi), Iron-Cobalt-Nickel-Manganese (FeCoNiMn), etc.; and Z includes non-metal elements and/or other doping elements and their combinations, such as Boron (B), Silicon (Si), Carbon (C), Nitrogen (N), Copper (Cu), Silver (Ag), Zirconium (Zr), etc.), Mn-based permanent magnetic materials X-Y or X-Y-Z (where X includes Mn, Fe, Manganese-Iron (MnFe), etc.; and Y includes Bismuth (Bi), Al, Gallium (Ga), and/or other doping elements such as Praseodymium (Pr), as well as the combination of these elements), transition metal-platinum-based magnetic material X-Y (where X includes transition metal elements and/or their combinations, such as Fe, Co, FeCo, etc.; and Y includes Platinum (Pt), Rhodium (Rh), Palladium (Pd), Zr, and/or their combinations with/without other doping elements), or Iron-Nitride (Fe—N). Specifically, each of the magnets can be Neodymium-Iron-Boron (NdFeB) based materials with different percentage of Neodymium (Nd) concentration.

In various embodiments, the core magnet typically has a width to height ratio to be higher than the width to height ratio of the cladding magnet. In some embodiments, the width to height ratio of the core magnet is higher than 6:1, while the width to height ratio of the cladding magnet is less than 2:1. In a preferred embodiment, the width to height ratio of the cladding magnet is approximately 1:1. The significantly smaller width of the cladding magnet as compared to the core magnet allows optimized magnetic field or magnetic flux in a given space, thus enabling a higher VCM efficiency without increasing permanent magnet materials. In other words, this technology solution improves the efficiency while does not incur additional materials cost. Without accurate and optimized control of cladding magnet with respect to the core magnet dimension and geometry, the materials solution benefit will be limited. In practice, each piece of magnet in the composite magnet can be glued together, after each piece magnetization has been set during the manufacturing process. Therefore, the finalized composite magnet can maintain the same size and shape as compared to current baseline configuration.

The following list of aspects reflects a variety of the embodiments explicitly contemplated by the present application. Those of ordinary skill in the art will readily appreciate that the aspects below are neither limiting of the embodiments disclosed herein, nor exhaustive of all of the embodiments conceivable from the disclosure above, but are instead meant to be exemplary in nature.

1. A hard disk drive includes composite permanent magnet as the voice coil motor magnet, wherein the composite permanent magnet comprising: a first core magnet M1, a cladding magnet Mc12 and a second core magnet M2. The magnetization direction of M1 and M2 are opposite to each other. The magnetization direction of Mc12 is substantially perpendicular to the magnetization direction of M1 and M2.

2. The hard disk drive includes composite permanent magnet as in aspect 1, wherein the size and the width of M1 and M2 of the composite permanent magnet are approximately the same.

3. The hard disk drive includes composite permanent magnet as in aspect 1, wherein the size and the width of Mc12 is smaller than the size and the width of M1 and M2 of the composite permanent magnet.

4. The hard disk drive includes composite permanent magnet as in aspect 1, wherein the magnetization direction of M1 and M2 of the composite permanent magnet are substantially perpendicular to the composite permanent magnet surface, the magnetization direction of Mc12 of the composite permanent magnet is parallel to the composite permanent magnet surface from M2 to M1, or from M1 to M2.

5. The hard disk drive includes composite permanent magnet as in aspect 1, wherein the shape of M1, Mc12 or M2 of the composite permanent magnet are in fan shape, trapezoid shape or rectangle shape as seen from the top view.

6. The hard disk drive includes composite permanent magnet as in aspect 1, wherein the height of each piece of magnet M1, Mc12 and M2 of the composite permanent magnet are approximately the same.

7. The hard disk drive includes composite permanent magnet as in aspect 1, wherein each piece of magnet M1, Mc12 and M2 within the composite permanent magnet materials is at least one of: alnico, ferrite, a rare earth-transition metal-based permanent magnetic material, a manganese-based permanent magnetic material, a transition metal-platinum-based magnetic material, Iron-Nitride (Fe—N), a Neodymium-based permanent magnetic material, such as Neodymium-Iron-Boron based materials with different percentage of Neodymium concentration or Neodymium-Iron-Boron with other doping materials, such as dysprosium.

8. The hard disk drive includes composite permanent magnet as in aspect 1, wherein M1, Mc12 and M2 are deposited, bonded, glued, sintered or assembled together, or placed next to each other to form the composite magnet.

9. The hard disk drive includes composite permanent magnet as in aspect 1, wherein each piece of magnet M1, Mc12 and M2 within the composite permanent magnet use the same materials.

10. The hard disk drive includes composite permanent magnet as in aspect 1, wherein the shape of one or more pieces of magnet M1, Mc12 and M2 of the composite permanent magnet are with rectangle shape or trapezoid shape as seen in the back view or the side view.

11. The hard disk drive includes composite permanent magnet as in aspect 1, wherein the ratio of the width of M1:Mc12 is approximately 3:1 as measured from the back view.

12. The hard disk drive includes composite permanent magnet as in aspect 1, wherein the ratio of the width of M1:Mc12 is approximately 4:1 as measured from the back view.

13. The hard disk drive includes composite permanent magnet as in aspect 1, wherein the ratio of the width of M1:Mc12 is between 2:1 to 10:1 as measured from the back view.

14. The hard disk drive includes composite permanent magnet as in aspect 1, wherein the ratio of the width of Mc12 to the height of Mc12 is approximately 1:1 as measured from the back view.

15. The hard disk drive includes composite permanent magnet as in aspect 1, wherein the ratio of the width of Mc12 to the height of Mc12 is approximately 2:1 as measured from the back view.

16. The hard disk drive includes composite permanent magnet as in aspect 1, wherein the ratio of the width of Mc12 to the height of Mc12 is approximately 3:2 as measured from the back view.

17. The hard disk drive includes composite permanent magnet as in aspect 1, wherein the ratio of the width of Mc12 to the height of Mc12 is between 3:1 to 1:3 as measured from the back view.

18. The hard disk drive includes composite permanent magnet as in aspect 1, wherein the composite permanent magnet is further attached to a soft magnetic yoke to form as one composite permanent magnet component.

19. The hard disk drive includes composite magnet component as in aspect 18, wherein M1, Mc12 and M2 are deposited, bonded, glued, sintered or assembled together, or placed next to each other to form the composite permanent magnet component.

20. The hard disk drive includes composite magnet component as in aspect 18, wherein the size and the width of M1 and M2 of the composite permanent magnet are approximately the same.

21. The hard disk drive includes composite magnet component as in aspect 18, wherein the size and the width of Mc12 is smaller than the size and the width of M1 and M2 of the composite permanent magnet.

22. The hard disk drive includes composite magnet component as in aspect 18, wherein the magnetization direction of M1 and M2 are perpendicular to the composite permanent magnet surface, the magnetization direction of Mc12 of the composite permanent magnet is parallel to the composite permanent magnet surface from M2 to M1, or from M1 to M2.

23. The hard disk drive includes composite magnet component as in aspect 18, wherein the shape of M1, Mc12 and M2 of the composite permanent magnet are in fan shape or trapezoid shape as seen in the top view.

24. The hard disk drive includes composite magnet component as in aspect 18, wherein the shape of M1, Mc12 and M2 of the composite permanent magnet are in trapezoid shape or rectangle shape as seen in the back view or the side view.

25. The hard disk drive includes composite magnet component as in aspect 18, wherein the height of each piece of magnet M1, Mc12 and M2 of the composite permanent magnet are approximately the same.

26. The hard disk drive includes composite magnet component as in aspect 18, wherein each piece of magnet M1, Mc12 and M2 within the composite permanent magnet materials is at least one of: alnico, ferrite, a rare earth-transition metal-based permanent magnetic material, a manganese-based permanent magnetic material, a transition metal-platinum-based magnetic material, Iron-Nitride (Fe—N), a Neodymium-based permanent magnetic material, such as Neodymium-Iron-Boron based materials with different percentage of Neodymium concentration or Neodymium-Iron-Boron with other doping materials, such as dysprosium.

27. The hard disk drive includes composite magnet component as in aspect 18, wherein M1, Mc12 and M2 are deposited, bonded, glued, sintered or assembled together, or placed next to each other to form the composite permanent magnet.

28. The hard disk drive includes composite magnet component as in aspect 18, wherein each piece of magnet M1, Mc12 and M2 within the composite permanent magnet use the same materials.

29. The hard disk drive includes composite magnet component as in aspect 18, wherein the shape of one or more pieces of magnet M1, Mc12 and M2 of the composite permanent magnet are in fan shape, trapezoid shape or rectangle shape from the top view.

30. The hard disk drive includes composite magnet component as in aspect 18, wherein the shape of one or more pieces of magnet M1, Mc12 and M2 of the composite permanent magnet are in rectangle or trapezoid shape as seen in the back view or the side view.

31. The hard disk drive includes composite magnet component as in aspect 18, wherein further includes covering or coating materials such as Nickel-plated coating, Zinc coating, Passivation, Epoxy-coating, Aluminum-coating or other painting materials.

32. The hard disk drive includes composite magnet component as in aspect 18, wherein the ratio of the width of M1:Mc12 is approximately 3:1 as measured from the back view.

33. The hard disk drive includes composite magnet component as in aspect 18, wherein the ratio of the width of M1:Mc12 is approximately 4:1 as measured from the back view.

34. The hard disk drive includes composite magnet component as in aspect 18, wherein the ratio of the width of M1:Mc12 is between 2:1 and 10:1 as measured from the back view.

35. The hard disk drive includes composite magnet component as in aspect 18, wherein the ratio of the width of Mc12 to the height of Mc12 is approximately 1:1 as measured from the back view.

36. The hard disk drive includes composite magnet component as in aspect 18, wherein the ratio of the width of Mc12 to the height of Mc12 is approximately 2:1 as measured from the back view.

37. The hard disk drive includes composite magnet component as in aspect 18, wherein the ratio of the width of Mc12 to the height of Mc12 is approximately 3:2 as measured from the back view.

38. The hard disk drive includes composite magnet component as in aspect 18, wherein the ratio of the width of Mc12 to the height of Mc12 is between 3:1 and 1:2 from the back view.

39. A hard disk drive includes composite permanent magnet as the voice coil motor magnet, wherein a composite permanent magnet comprising: a first cladding magnet Mc11, a first core magnet M1, a second cladding magnet Mc12, a second core magnet M2 and a third cladding magnet Mc22. The magnetization direction of M1 and M2 are opposite to each other. The magnetization direction of Mc12 is substantially perpendicular to the magnetization direction of M1 and M2.

40. The hard disk drive includes composite permanent magnet as in aspect 39, wherein the magnetization direction of Mc11 and Mc22 are with acute angle or rectangle with respect to the magnetization direction of M1 and M2 respectively.

41. The hard disk drive includes composite permanent magnet as in aspect 39, wherein the size and the width of Mc11, Mc12 or Mc22 is smaller than the size and the width of M1 and M2 of the composite permanent magnet.

42. The hard disk drive includes composite permanent magnet as in aspect 39, wherein the composite permanent magnet is further attached to a soft magnetic yoke and forms a composite permanent magnet component.

43. The hard disk drive includes composite permanent magnet as in aspect 39, wherein the shape of one or more pieces of magnet Mc11, M1, Mc12, M2 or Mc22 of the composite permanent magnet are in fan shape or trapezoid shape.

44. The hard disk drive includes composite permanent magnet as in aspect 39, wherein the shape of one or more pieces of magnet Mc11, M1, Mc12, M2 or Mc22 of the composite permanent magnet are with rectangle or trapezoid shape as seen in the back view or the side view.

45. The hard disk drive includes composite permanent magnet as in aspect 39, wherein the height of each piece of magnet Mc11, M1, Mc12, M2 and Mc22 of the composite permanent magnet are approximately the same.

46. The hard disk drive includes composite permanent magnet as in aspect 39, wherein each piece of magnet Mc11, M1, Mc12, M2 and Mc22 within the composite permanent magnet materials is at least one of: alnico, ferrite, a rare earth-transition metal-based permanent magnetic material, a manganese-based permanent magnetic material, a transition metal-platinum-based magnetic material, Iron-Nitride (Fe—N), a Neodymium-based permanent magnetic material, such as Neodymium-Iron-Boron based materials with different percentage of Neodymium (Nd) concentration or Neodymium-Iron-Boron with other doping materials, such as dysprosium.

47. The hard disk drive includes composite permanent magnet as in aspect 39, wherein the shape of one or more pieces of magnet M1, Mc12 and M2 of the composite permanent magnet are in fan shape or trapezoid shape from the top view.

48. The hard disk drive includes composite permanent magnet as in aspect 39, wherein the shape of one or more pieces of magnet M1, Mc12 and M2 of the composite permanent magnet are with rectangle shape as seen in the back view or the side view.

49. The hard disk drive includes composite permanent magnet as in aspect 39, wherein the size and the width of M1 and M2 of the composite permanent magnet are approximately the same.

50. The hard disk drive includes composite permanent magnet as in aspect 39, wherein the size and the width of Mc12 is smaller than the size and the width of M1 and M2 of the composite permanent magnet.

51. The hard disk drive includes composite permanent magnet as in aspect 39, wherein the magnetization direction of M1 and M2 of the composite permanent magnet are perpendicular to the composite permanent magnet surface, the magnetization direction of Mc12 of the composite permanent magnet is parallel to the composite permanent magnet surface.

52. The hard disk drive includes composite permanent magnet as in aspect 39, wherein each piece of magnet Mc11, M1, Mc12, M2 and Mc22 within the composite permanent magnet materials is at least one of: alnico, ferrite, a rare earth-transition metal-based permanent magnetic material, a manganese-based permanent magnetic material, a transition metal-platinum-based magnetic material, Iron-Nitride (Fe—N), a Neodymium-based permanent magnetic material, such as Neodymium-Iron-Boron based materials with different percentage of Neodymium concentration or Neodymium-Iron-Boron with other doping materials, such as dysprosium.

53. The hard disk drive includes composite permanent magnet as in aspect 39, wherein Mc11, M1, Mc12, M2 and Mc22 are deposited, bonded, glued, sintered or assembled together, or placed next to each other to form the composite permanent magnet.

54. The hard disk drive includes composite permanent magnet as in aspect 39, wherein each piece of magnet Mc11, M1, Mc12, M2 and Mc22 within the composite permanent magnet use the same materials.

55. The hard disk drive includes composite permanent magnet as in aspect 39, wherein the shape of one or more pieces of magnet Mc11, M1, Mc12, M2 and Mc22 are in fan shape or trapezoid shape from the top view.

56. The hard disk drive includes composite permanent magnet as in aspect 39, wherein the shape of one or more pieces of magnet Mc11, M1, Mc12, M2 or Mc22 are with rectangle shape or trapezoid shape as seen in the back view or the side view.

57. The hard disk drive includes composite permanent magnet as in aspect 39, wherein the ratio of the width of M1:Mc12 is approximately 3:1 as measured from the back view.

58. The hard disk drive includes composite permanent magnet as in aspect 39, wherein the ratio of the width of M1:Mc12 is approximately 4:1 as measured from the back view.

59. The hard disk drive includes composite permanent magnet as in aspect 39, wherein the ratio of the width of M1:Mc12 is between 10:1 to 2:1 as measured from the back view.

60. The hard disk drive includes composite permanent magnet as in aspect 39, wherein the ratio of the width of Mc12 to the height of Mc12 is approximately 1:1 as measured from the back view.

61. The hard disk drive includes composite permanent magnet as in aspect 39, wherein the ratio of the width of Mc12 to the height of Mc12 is approximately 2:1 as measured from the back view.

62. The hard disk drive includes composite permanent magnet as in aspect 39, wherein the ratio of the width of Mc12 to the height of Mc12 is approximately 3:2 as measured from the back view.

63. The hard disk drive includes composite permanent magnet as in aspect 39, wherein the ratio of the width of Mc12 to the height of Mc12 is between 3:1 to 1:3 as measured from the back view.

64. The hard disk drive includes composite permanent magnet as in aspect 39, wherein the composite permanent magnet is further attached to a soft magnetic yoke to form one composite magnet component.

65. The hard disk drive includes composite magnet component as in aspect 64, wherein Mc11, M1, Mc12, M2 and Mc22 are deposited, bonded, glued, sintered or assembled together, or placed next to each other to form the composite permanent magnet component.

66. The hard disk drive includes composite magnet component as in aspect 64, wherein the size and the width of M1 and M2 of the composite permanent magnet are approximately the same.

67. The hard disk drive includes composite magnet component as in aspect 64, wherein the size and the width of Mc12 is smaller than the size and the width of M1 and M2 of the composite permanent magnet.

68. The hard disk drive includes composite magnet component as in aspect 64, wherein the magnetization direction of M1 and M2 of the composite permanent magnet are substantially perpendicular to the composite permanent magnet surface, the magnetization direction of Mc12 of the composite permanent magnet is substantially parallel to the composite permanent magnet surface.

69. The hard disk drive includes composite magnet component as in aspect 64, wherein the shape of M1, Mc12 or M2 of the composite permanent magnet are in fan shape or trapezoid shape as seen in the top view.

70. The hard disk drive includes composite magnet component as in aspect 64, wherein the shape of M1, Mc12 or M2 of the composite permanent magnet are in trapezoid shape or rectangle shape as seen in the back view or the side view.

71. The hard disk drive includes composite magnet component as in aspect 64, wherein the shape of M1, Mc12 or M2 of the composite permanent magnet are in fan shape or trapezoid shape as seen in the top view.

72. The hard disk drive includes composite magnet component as in aspect 64, wherein the shape of M1, Mc12 or M2 of the composite permanent magnet are with trapezoid shape or rectangle shape as seen in the back view or the side view.

73. The hard disk drive includes composite magnet component as in aspect 64, wherein Mc11, M1, Mc12, M2 or Mc22 of the composite permanent magnet are in fan shape as seen in the top view.

74. The hard disk drive includes composite magnet component as in aspect 64, wherein Mc11, M1, Mc12, M2 or Mc22 of the composite permanent magnet are in trapezoid shape or rectangle shape as seen in the back view or the side view.

75. The hard disk drive includes composite magnet component as in aspect 64, wherein the height of each piece of magnet Mc11, M1, Mc12, M2 or Mc22 of the composite permanent magnet are approximately the same.

76. The hard disk drive includes composite magnet component as in aspect 64, wherein each piece of magnet Mc11, M1, Mc12, M2 or Mc22 within the composite permanent magnet materials is at least one of: alnico, ferrite, a rare earth-transition metal-based permanent magnetic material, a manganese-based permanent magnetic material, a transition metal-platinum-based magnetic material, Iron-Nitride (Fe—N), a Neodymium-based permanent magnetic material, such as Neodymium-Iron-Boron based materials with different percentage of Neodymium concentration or Neodymium-Iron-Boron with other doping materials, such as dysprosium.

77. The hard disk drive includes composite magnet component as in aspect 64, wherein Mc11, M1, Mc12, M2 or Mc22 are deposited, bonded, glued, sintered or assembled together, or placed next to each other to form the composite permanent magnet.

78. The hard disk drive includes composite magnet component as in aspect 64, wherein each piece of magnet Mc11, M1, Mc12, M2 or Mc22 within the composite permanent magnet use the same materials.

79. The hard disk drive includes composite magnet component as in aspect 64, wherein the shape of one or more pieces of magnet Mc11, M1, Mc12, M2 or Mc22 of the composite permanent magnet are in fan shape or trapezoid shape as seen from the top view.

80. The hard disk drive includes composite magnet component as in aspect 64, wherein the shape of one or more pieces of magnet Mc11, M1, Mc12, M2 or Mc22 of the composite permanent magnet are in rectangle shape or trapezoid shape as seen in the back view or the side view.

81. The hard disk drive includes composite magnet component as in aspect 64, wherein the shape of one or more pieces of magnet Mc11, M1, Mc12, M2 or Mc22 of the composite permanent magnet are in fan shape or trapezoid shape as seen from the top view.

82. The hard disk drive includes composite magnet component as in aspect 64, wherein the shape of one or more pieces of magnet Mc11, M1, Mc12, M2 or Mc22 of the composite permanent magnet are with rectangle shape or trapezoid shape as seen in the back view or the side view.

83. The hard disk drive includes composite magnet component as in aspect 64, wherein further includes covering or coating materials such as Nickel-plated coating, Zinc coating, Passivation, Epoxy-coating, Aluminum-coating or other painting materials.

84. A hard disk drive includes drive case and cover plate, the storage media platers and spindle, the recording heads and actuators, the connection port, the control logic board and voice coil motor, where the actuators are operated via a voice coil motor. The voice coil motor magnets comprise of a pair of composite magnet component on one or both sides of the voice coil, where each piece of composite magnet component comprising: a first core magnet M1, a cladding magnet Mc12 and a second core magnet M2 attached to a soft magnetic yoke. The magnetization direction of M1 is perpendicular to the composite permanent magnet surface, the magnetization direction of M2 is opposite to the magnetization direction of M1. The magnetization direction of Mc12 is substantially perpendicular to the magnetization direction of M1 and M2.

85. The hard disk drive as described in aspect 84, wherein the composite permanent magnet further includes additional piece of cladding magnet, such as: Mc11, Mc21 or Mc22 attached to either end of the core magnet M1 and M2; wherein the magnetization direction of the additional cladding magnet is with an acute angle or rectangle with respect to the magnetization direction of the core M1 or M2 next to itself respectively.

86. The hard disk drive as described in aspect 84, wherein the cladding magnet Mc12 is positioned in between the first core magnet M1 and the second core magnet M2.

87. A hard disk drive includes composite permanent magnet as the voice coil motor magnet, where a composite permanent magnet comprising: a number of core magnets named M1, M2, Mn from one end to the other, where n is a positive integer equals or larger than 2; wherein each piece of magnet within the composite permanent magnet are connected together or placed next to each other, wherein two core magnets Ma and Mb satisfy the follow: 1) a and b are integer and a is less than b;

2) the magnetization direction of Ma and Mb are in opposite directions and substantially perpendicular to the composite permanent magnet surface; 3) at least one of Ma or Mb has cladding magnet Mai or Mbi, where i is a positive integer, that is in contact or placed next to Ma or Mb; the magnetization direction of the cladding magnet Mai and Mbi has an acute angle or a rectangle with respective to the magnetization of Ma and Mb respectively.

88. The hard disk drive includes composite permanent magnet as in aspect 87, wherein the width of Ma and Mb is approximately the same.

89. The hard disk drive includes composite permanent magnet as in aspect 87, wherein the size of the cladding magnet is smaller than the size of the core magnet Ma and Mb.

90. The hard disk drive includes composite permanent magnet as in aspect 87, wherein the composite permanent magnet is further attached to a soft magnetic yoke and forms a composite permanent magnet component.

91. The hard disk drive includes composite permanent magnet as in aspect 87, wherein the shape of one or more core magnet of the composite permanent magnet are in fan shape or trapezoid shape as seen from the top view.

92. The hard disk drive includes composite permanent magnet as in aspect 87, wherein the shape of one or more magnet of the composite permanent magnet are with rectangle or trapezoid shape as seen from the back view or the side view.

93. The hard disk drive includes composite permanent magnet as in aspect 87, wherein the height or the thickness of each magnet of the composite permanent magnet are approximately the same.

94. The hard disk drive includes composite permanent magnet as in aspect 87, wherein each piece of magnet within the composite permanent magnet materials is at least one of: alnico, ferrite, a rare earth-transition metal-based permanent magnetic material, a manganese-based permanent magnetic material, a transition metal-platinum-based magnetic material, Iron-Nitride (Fe—N), a Neodymium-based permanent magnetic material, such as Neodymium-Iron-Boron based materials with different percentage of Neodymium (Nd) concentration or Neodymium-Iron-Boron with other doping materials, such as dysprosium.

95. The hard disk drive includes composite permanent magnet as in aspect 87, wherein a cladding magnet Mca2 is placed between Ma and Mb.

96. The hard disk drive includes composite permanent magnet as in aspect 95, wherein the ratio of the width of Ma to the width of Mca2 is between 10:1 to 2:1.

97. The hard disk drive includes composite permanent magnet as in aspect 95, wherein the ratio of the width of Ma to the height of Ma is between 10:1 to 2:1.

98. The hard disk drive includes composite permanent magnet as in aspect 95, wherein the ratio of the width of Mca2 to the height of Mca2 is between 3:1 to 1:3.

99. A hard disk drive includes composite permanent magnet as the voice coil motor magnet, where a composite permanent magnet comprising two separate core magnet M1 and M2, wherein M1 and M2 has the trapezoid shape as seen from the back view. At least one of the core magnets has a cladding magnet. The magnetization direction of the cladding magnet that is in contact or placed next to M1 and M2 has an acute angle or a rectangle with respective to the magnetization of M1 and M2 respectively.

100. The hard disk drive includes composite permanent magnet as in aspect 99, wherein ratio of the width of the cladding magnet to the thickness of the cladding magnet is 3:1 or less.

101. A hard disk drive includes composite permanent magnet as the voice coil motor magnet, wherein the composite permanent magnet comprising: a first core magnet M1, a cladding magnet Mc12 and a second core magnet M2; the magnetization direction of M1 and M2 are opposite to each other; the magnetization direction of Mc12 is substantially perpendicular to the magnetization direction of M1 and M2; and the ratio of Mc12 width to thickness or height is less than 4:1.

102. The hard disk drive includes composite permanent magnet as in aspect 101, wherein the size and the width of M1 and M2 of the composite permanent magnet are approximately the same.

103. The hard disk drive includes composite permanent magnet as in aspect 101, wherein the size and the width of Mc12 is smaller than the size and the width of M1 and M2 of the composite permanent magnet.

104. The hard disk drive includes composite permanent magnet as in aspect 101, wherein the magnetization direction of M1 and M2 of the composite permanent magnet are substantially perpendicular to the composite permanent magnet surface, the magnetization direction of Mc12 of the composite permanent magnet is parallel to the composite permanent magnet surface from M2 to M1, or from M1 to M2.

105. The hard disk drive includes composite permanent magnet as in aspect 101, wherein the shape of M1, Mc12 or M2 of the composite permanent magnet are in fan shape, trapezoid shape or rectangle shape as seen from the top view.

106. The hard disk drive includes composite permanent magnet as in aspect 101, wherein the height of each piece of magnet M1, Mc12 and M2 of the composite permanent magnet are approximately the same.

107. The hard disk drive includes composite permanent magnet as in aspect 101, wherein each piece of magnet M1, Mc12 and M2 within the composite permanent magnet materials is at least one of: alnico, ferrite, a rare earth-transition metal-based permanent magnetic material, a manganese-based permanent magnetic material, a transition metal-platinum-based magnetic material, Iron-Nitride (Fe—N), a Neodymium-based permanent magnetic material, such as Neodymium-Iron-Boron based materials with different percentage of Neodymium concentration or Neodymium-Iron-Boron with other doping materials, such as dysprosium.

108. The hard disk drive includes composite permanent magnet as in aspect 101, wherein M1, Mc12 and M2 are deposited, bonded, glued, sintered or assembled together, or placed next to each other to form the composite magnet.

109. The hard disk drive includes composite permanent magnet as in aspect 101, wherein each piece of magnet M1, Mc12 and M2 within the composite permanent magnet use the same materials.

110. The hard disk drive includes composite permanent magnet as in aspect 101, wherein the shape of one or more pieces of magnet M1, Mc12 and M2 of the composite permanent magnet are with rectangle shape or trapezoid shape as seen in the back view or the side view.

111. The hard disk drive includes composite permanent magnet as in aspect 101, wherein the ratio of the width of M1:Mc12 is approximately 3:1 as measured from the back view.

112. The hard disk drive includes composite permanent magnet as in aspect 101, wherein the ratio of the width of M1:Mc12 is approximately 4:1 as measured from the back view.

113. The hard disk drive includes composite permanent magnet as in aspect 101, wherein the ratio of the width of M1:Mc12 is between 2:1 to 10:1 as measured from the back view.

114. The hard disk drive includes composite permanent magnet as in aspect 101, wherein the ratio of the width of Mc12 to the height of Mc12 is approximately 1:1 as measured from the back view.

115. The hard disk drive includes composite permanent magnet as in aspect 101, wherein the ratio of the width of Mc12 to the height of Mc12 is approximately 2:1 as measured from the back view.

116. The hard disk drive includes composite permanent magnet as in aspect 101, wherein the ratio of the width of Mc12 to the height of Mc12 is approximately 3:2 as measured from the back view.

117. The hard disk drive includes composite permanent magnet as in aspect 101, wherein the ratio of the width of Mc12 to the height of Mc12 is between 3:1 to 1:3 as measured from the back view.

118. The hard disk drive includes composite permanent magnet as in aspect 101, wherein the composite permanent magnet is further attached to a soft magnetic yoke to form as one composite permanent magnet component.

119. The hard disk drive includes composite magnet component as in aspect 118, wherein M1, Mc12 and M2 are deposited, bonded, glued, sintered or assembled together, or placed next to each other to form the composite permanent magnet component.

120. The hard disk drive includes composite magnet component as in aspect 118, wherein the size and the width of M1 and M2 of the composite permanent magnet are approximately the same.

121. The hard disk drive includes composite magnet component as in aspect 18, wherein the size and the width of Mc12 is smaller than the size and the width of M1 and M2 of the composite permanent magnet.

122. The hard disk drive includes composite magnet component as in aspect 118, wherein the magnetization direction of M1 and M2 are perpendicular to the composite permanent magnet surface, the magnetization direction of Mc12 of the composite permanent magnet is parallel to the composite permanent magnet surface from M2 to M1, or from M1 to M2.

123. The hard disk drive includes composite magnet component as in aspect 118, wherein the shape of M1, Mc12 and M2 of the composite permanent magnet are in fan shape or trapezoid shape as seen in the top view.

124. The hard disk drive includes composite magnet component as in aspect 118, wherein the shape of M1, Mc12 and M2 of the composite permanent magnet are in trapezoid shape or rectangle shape as seen in the back view or the side view.

125. The hard disk drive includes composite magnet component as in aspect 118, wherein the height of each piece of magnet M1, Mc12 and M2 of the composite permanent magnet are approximately the same.

126. The hard disk drive includes composite magnet component as in aspect 118, wherein each piece of magnet M1, Mc12 and M2 within the composite permanent magnet materials is at least one of: alnico, ferrite, a rare earth-transition metal-based permanent magnetic material, a manganese-based permanent magnetic material, a transition metal-platinum-based magnetic material, Iron-Nitride (Fe—N), a Neodymium-based permanent magnetic material, such as Neodymium-Iron-Boron based materials with different percentage of Neodymium concentration or Neodymium-Iron-Boron with other doping materials, such as dysprosium.

127. The hard disk drive includes composite magnet component as in aspect 118, wherein M1, Mc12 and M2 are deposited, bonded, glued, sintered or assembled together, or placed next to each other to form the composite permanent magnet.

128. The hard disk drive includes composite magnet component as in aspect 118, wherein each piece of magnet M1, Mc12 and M2 within the composite permanent magnet use the same materials.

129. The hard disk drive includes composite magnet component as in aspect 118, wherein the shape of one or more pieces of magnet M1, Mc12 and M2 of the composite permanent magnet are in fan shape, trapezoid shape or rectangle shape from the top view.

130. The hard disk drive includes composite magnet component as in aspect 118, wherein the shape of one or more pieces of magnet M1, Mc12 and M2 of the composite permanent magnet are in rectangle or trapezoid shape as seen in the back view or the side view.

131. The hard disk drive includes composite magnet component as in aspect 118, wherein further includes covering or coating materials such as Nickel-plated coating, Zinc coating, Passivation, Epoxy-coating, Aluminum-coating or other painting materials.

132. The hard disk drive includes composite magnet component as in aspect 118, wherein the ratio of the width of M1:Mc12 is approximately 3:1 as measured from the back view.

133. The hard disk drive includes composite magnet component as in aspect 118, wherein the ratio of the width of M1:Mc12 is approximately 4:1 as measured from the back view.

134. The hard disk drive includes composite magnet component as in aspect 118, wherein the ratio of the width of M1:Mc12 is between 2:1 and 10:1 as measured from the back view.

135. The hard disk drive includes composite magnet component as in aspect 118, wherein the ratio of the width of Mc12 to the height of Mc12 is approximately 1:1 as measured from the back view.

136. The hard disk drive includes composite magnet component as in aspect 118, wherein the ratio of the width of Mc12 to the height of Mc12 is approximately 2:1 as measured from the back view.

137. The hard disk drive includes composite magnet component as in aspect 118, wherein the ratio of the width of Mc12 to the height of Mc12 is approximately 3:2 as measured from the back view.

138. The hard disk drive includes composite magnet component as in aspect 118, wherein the ratio of the width of Mc12 to the height of Mc12 is between 3:1 and 1:2 from the back view.

The embodiments were chosen and described to best explain the principles of the invention and its practical application to persons who are skilled in the art. As various modifications, could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents. Modifications and variations may be made to the disclosed embodiments while remaining within the spirit and scope of the method, system and apparatus. The implementations described above and other implementations are within the scope of the following claims.

The invention claimed is:

1. A hard disk drive comprising a drive case and a cover plate, storage media platters and a spindle, recording heads and actuators, a connection port, a control logic board and one or more voice coil motors, where the actuators are operated via the one or more voice coil motors to enable the recording heads to access different data tracks on the media platters to complete read and write operations, wherein the one or more voice coil motors include magnets comprising a pair of composite permanent magnets on both sides of a voice coil, where each piece of composite permanent magnet comprises: a first core magnet M1, a cladding magnet Mc12 and a second core magnet M2; the magnetization direction of M1 and M2 are opposite to each other; the magnetization direction of Mc12 is substantially perpendicular to the magnetization direction of M1 and M2; the ratio of the width of Mc12 to the thickness or the height of Mc12 is less than 3:1 but higher than 1:3 as seen from the back view; the ratio of the width of M1 to the width of Mc12 is between 2:1 and 10:1 as seen from the back view; and the ratio of the width of M1 to the thickness or the height of M1 is 3:1 or higher as seen from the back view.

2. The hard disk drive according to claim 1, wherein the shape of Mc12 is different as compared to M1 and M2 of the composite permanent magnets as seen from the top down view.

3. The hard disk drive according to claim 1, wherein the shape of Mc12 is approximately the same as compared to the shape of M1 and M2 of the composite permanent magnets as seen from the side view, either in a rectangle of trapezoid shape.

4. The hard disk drive according to claim 1, wherein the shape of one or more pieces of magnet M1, Mc12 and M2 of the composite permanent magnets are in fan shape or trapezoid shape from the top view.

5. The hard disk drive according to claim 1, wherein the shape of the cladding magnet Mc12 is in rectangle shape or in trapezoid shape from the top view, and the shape of the core magnet M1 and M2 is in fan shape or in trapezoid shape from the top view.

6. The hard disk drive according to claim 1, wherein each piece of magnet Ml, Mc12 and M2 within the composite permanent magnet comprises materials including at least one of: alnico, ferrite, a rare earth-transition metal-based permanent magnetic material, a manganese-based permanent magnetic material, a transition metal-platinum-based magnetic material, Iron-Nitride (Fe-N), a Neodymium-based permanent magnetic material.

7. The hard disk drive according to claim 1, wherein M1, Mc12 and M2 are deposited, bonded, glued, sintered or assembled together, or placed next to each other to form the composite magnets.

8. The hard disk drive according to claim 1, wherein the materials composition for the cladding magnet Mc12 is different from the core magnets M1 and M2.

9. The hard disk drive according to claim 1, wherein the shape of one or more pieces of magnet M1, Mc12 and M2 of the composite permanent magnets are in rectangle shape or in trapezoid shape as seen from the back view or the side view.

10. The hard disk drive according to claim 1, wherein the composite permanent magnets are further attached to a soft magnetic yoke to form as one composite permanent magnet component for the one or more voice coil motors, the thickness of the cladding are approximately the same.

11. A magnetic hard disk drive comprising a drive case and a cover plate, storage media platters and a spindle, recording heads and actuators, a connection port, a control logic board and one or more voice coil motors, where the actuators are operated via the one or more voice coil motors to enable the recording heads to access different data tracks on the media platters to complete read and write operation; wherein the one or more voice coil motors includes magnets comprising a pair of composite permanent magnets on both sides of a voice coil, where each piece of composite permanent magnet comprises: a first cladding magnet Mc11, a first magnet M1, a second cladding magnet Mc12, a second magnet M2 and a third cladding magnet Mc22; wherein Mc11, M1, Mc12, M2 and Mc22 are deposited or assembled together or next to each other; and the magnetization direction of M1 and M2 are opposite to each other; the magnetization direction of Mc12 is substantially perpendicular to the magnetization direction of M1 and M2, the ratio of the width of Mc12 to the thickness or the height of Mc12 is less than 3:1 but higher than 1:3 as seen from the back view; the ratio of the width of M1 to the width of Mc12 is between 2:1 and 10:1 as seen from the back view; and the ratio of the width of M1 to the thickness or the height of M1 is 3:1 or higher as seen from the back view.

12. The hard disk drive according to claim 11, wherein the magnetization directions of Mc11 and the magnetization direction of M1 form an angle between 30 degrees and 90 degrees.

13. The hard disk drive according to claim 11, wherein the size of each piece of the core magnet M1 and M2 is larger than the size of each piece of the cladding magnet Mc11, Mc12 and Mc22 of the composite permanent magnets.

14. The hard disk drive according to claim 11, wherein the shape of one or more pieces of magnet Mc11, M1, Mc12, M2 or Mc22 of the composite permanent magnets are in fan shape or trapezoid shape from the top view.

15. The hard disk drive according to claim 11, wherein the shape of the cladding magnets Mc11, Mc12 and Mc22 are approximately the same as compared to the shape of the core magnets M1 and M2 of the composite permanent magnets as seen from the side view; and the thickness of the cladding magnets Mc11, Mc12 and Mc22 are approximately the same as compared to the thickness of the core magnets M1 and M2 of the composite permanent magnets.

16. The hard disk drive according to claim 11, wherein each piece of magnet Mc11, M1, Mc12, M2 and Mc22 within the composite permanent magnet materials is at least one of: alnico, ferrite, a rare earth-transition metal-based permanent magnetic material, a manganese-based permanent magnetic material, a transition metal-platinum-based magnetic material, Iron-Nitride (Fe-N), a Neodymium-based permanent magnetic material.

17. A hard disk drive comprising a drive case and a cover plate, storage media platters and a spindle, recording heads and actuators, a connection port, a control logic board and one or more voice coil motors, where the actuators are operated via the one or more voice coil motors and enable the recording head to access different data tracks on the media platters to complete read and write operations; wherein the one or more voice coil motors include magnets comprising a pair of composite permanent magnets on both sides of a voice coil, where each piece of composite permanent magnet comprises: a number of core magnets named M1, M2, Mn from one end to the other, where n is a positive integer greater than or equal to 2; wherein two core magnets Ma and Mb satisfy the follow: 1) a and b are integer and a is not equal to b; 2) the magnetization direction of Ma and Mb are in opposite directions and substantially perpendicular to the composite permanent magnet surface; 3) at least one of Ma or Mb has cladding magnet Mcai or Mcbi, where i is a positive integer, that is in contact or placed next to Ma or Mb respectively; wherein the magnetization direction of the cladding magnet Mcai and the magnetization direction of the core magnet Ma form an angle of between 30 and 90 degrees; 4) the ratio of the width of Mcai to the thickness or the height of Mcai is less than 3:1 but higher than 1:3 as seen from the back view; the ratio of the width of Ma to the width of Mcai is between 2:1 and 10:1 as seen from the back view; and the ratio of the width of Ma to the thickness or the height of Ma is 3:1 or higher as seen from the back view.

18. The hard disk drive according to claim 17, wherein one of the cladding magnet Mcai uses different materials as compared to the core magnet ma.

\* \* \* \* \*